US009053547B2

(12) United States Patent
Kitamura et al.

(10) Patent No.: US 9,053,547 B2
(45) Date of Patent: Jun. 9, 2015

(54) THREE-DIMENSIONAL POINT CLOUD POSITION DATA PROCESSING DEVICE, THREE-DIMENSIONAL POINT CLOUD POSITION DATA PROCESSING SYSTEM, AND THREE-DIMENSIONAL POINT CLOUD POSITION DATA PROCESSING METHOD AND PROGRAM

(71) Applicant: Kabushiki Kaisha Topcon, Itabashi-ku, Tokyo (JP)

(72) Inventors: Kazuo Kitamura, Tokyo (JP); Nobuo Kochi, Tokyo (JP); Tadayuki Ito, Tokyo (JP); Hitoshi Otani, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 61 days.

(21) Appl. No.: 14/051,096

(22) Filed: Oct. 10, 2013

(65) Prior Publication Data
US 2014/0037194 A1   Feb. 6, 2014
US 2014/0314308 A2   Oct. 23, 2014

Related U.S. Application Data

(63) Continuation of application No. PCT/JP2012/059979, filed on Apr. 12, 2012.

(30) Foreign Application Priority Data

Apr. 13, 2011   (JP) .................................. 2011-089483

(51) Int. Cl.
*G06T 7/00* (2006.01)
*G01B 11/24* (2006.01)

(52) U.S. Cl.
CPC .............. *G06T 7/0046* (2013.01); *G01B 11/24* (2013.01); *G06T 2207/10028* (2013.01); *G06T 2207/30184* (2013.01); *G06T 7/0032* (2013.01)

(58) Field of Classification Search
CPC .................... G06T 7/0046; G06T 2207/10028
See application file for complete search history.

(56) References Cited

U.S. PATENT DOCUMENTS 6,330,523 B1   12/2001   Kacyra et al.
8,045,762 B2   10/2011   Otani et al.
(Continued)

FOREIGN PATENT DOCUMENTS

JP   2000-509150 A   7/2000
JP   2004-272459 A   9/2004
(Continued)

OTHER PUBLICATIONS (Andrew Zisserman, "Multiple View Geometry", Cambridge University Press New York, NY, USA © 2003).*
(Continued)

*Primary Examiner* — Stephen R Koziol
*Assistant Examiner* — Totam Le
(74) *Attorney, Agent, or Firm* — Brinks Gilson & Lione

(57) ABSTRACT

A technique is provided for efficiently process three-dimensional point cloud position data that are obtained at different viewpoints. A projecting plane is set in a measurement space as a parameter for characterizing a target plane contained in plural planes that form an object. The target plane and other planes are projected on the projecting plane. Then, a distance between each plane and the projecting plane is calculated at each grid point on the projecting plane, and the calculated matrix data is used as a range image that characterizes the target plane. The range image is also formed with respect to the other planes and with respect to planes that are viewed from another viewpoint. The range images of the two viewpoints are compared, and a pair of the planes having the smallest difference between the range images thereof is identified as matching planes between the two viewpoints.

15 Claims, 16 Drawing Sheets

(56) References Cited

U.S. PATENT DOCUMENTS

| | | | |
|---|---|---|---|
| 2012/0075342 A1* | 3/2012 | Choubassi et al. | 345/633 |
| 2012/0256916 A1 | 10/2012 | Kitamura et al. | |

FOREIGN PATENT DOCUMENTS

| | | |
|---|---|---|
| JP | 2005-024370 A | 1/2005 |
| JP | 2006-214893 A | 8/2006 |
| JP | 2008-082707 A | 4/2008 |
| JP | 2010-127819 A | 6/2010 |
| WO | WO 2011/070927 A1 | 6/2011 |
| WO | WO 2012/053521 A1 | 4/2012 |

OTHER PUBLICATIONS (Manbolis I. A. Lourakis, "Feature Transfer and Matching in Disparate Stereo Views through the User of Plane Homographies", IEEE Transaction on Patern Analysis and Machine Intelligence, vol. 25, No. 2, Feb. 203).*

International Search Report for International Application No. PCT/JP2012/059979, dated Jul. 10, 2012, 2 pages.

* cited by examiner $$RMS = \sqrt{\frac{\Sigma |P_i - Q_i|}{N}}$$

Fig. 14
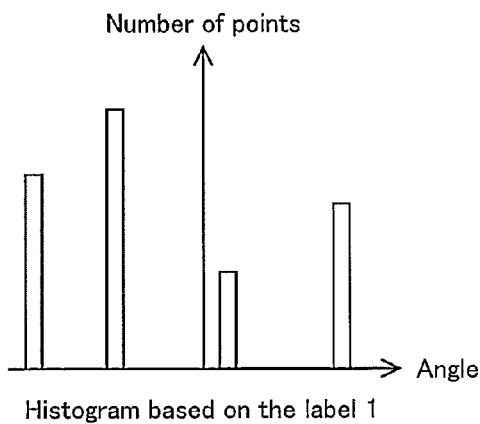
Histogram based on the label 1
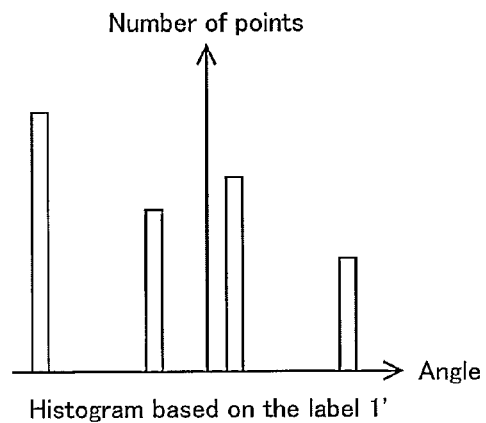
Histogram based on the label 1'
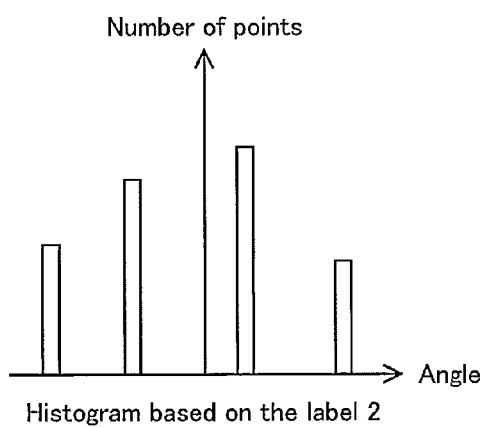
Histogram based on the label 2
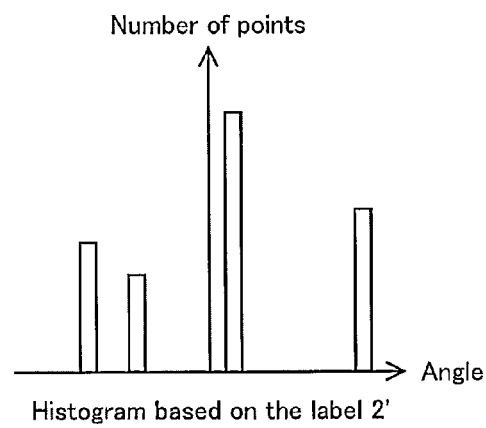
Histogram based on the label 2'
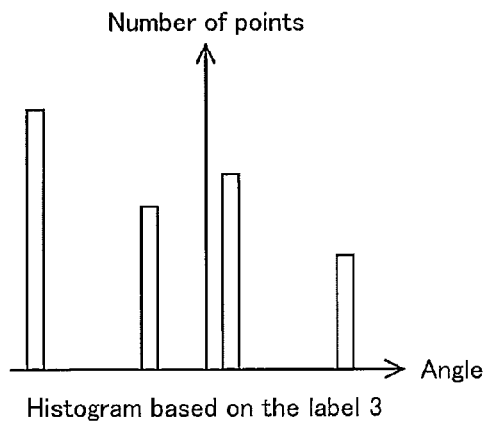
Histogram based on the label 3
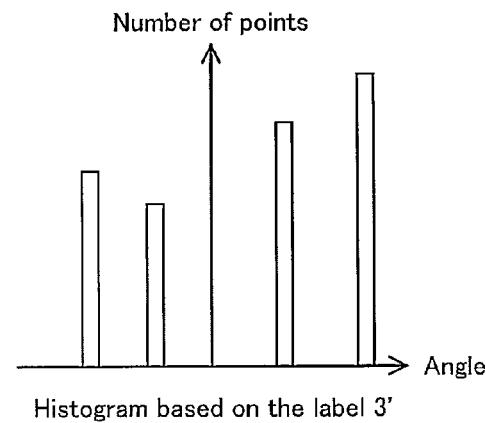
Histogram based on the label 3'

THREE-DIMENSIONAL POINT CLOUD POSITION DATA PROCESSING DEVICE, THREE-DIMENSIONAL POINT CLOUD POSITION DATA PROCESSING SYSTEM, AND THREE-DIMENSIONAL POINT CLOUD POSITION DATA PROCESSING METHOD AND PROGRAM

RELATED APPLICATIONS

This application is a continuation of PCT/JP2012/059979 filed on Apr. 12, 2012, which claims priority to Japanese Application No. 2011-089483 filed on Apr. 13, 2011. The entire contents of these applications are incorporated herein by reference.

BACKGROUND OF THE INVENTION

1. Field of the Invention

The present invention relates to a technique for measuring three-dimensional information.

2. Description of Related Art

A technique for constructing a three-dimensional model from three-dimensional point cloud position data of an object is known. In the three-dimensional point cloud position data, a two-dimensional image is linked with three-dimensional coordinates. That is, in the three-dimensional point cloud position data, data of a two-dimensional image of an object, plural measured points (point cloud) that are matched with the two-dimensional image, and positions (three-dimensional coordinates) of the measured points in a three-dimensional space, are associated with each other. According to the three-dimensional point cloud position data, a three-dimensional model of a reproduced outer shape of the object is obtained by using a set of points. In addition, since three-dimensional coordinates of each point are obtained, the relative position of each point in the three-dimensional space is understood. Therefore, a screen-displayed image of a three-dimensional model can be rotated, and the image can be switched to an image that is viewed from a different position.

For example, in the invention disclosed in Japanese Unexamined Patent Application Publication (Translation of PCT Application) No. 2000-509150, a scanning laser device scans a three-dimensional object and generates point clouds. The point clouds are divided into the group of edge points and the group of non-edge points, based on changes in depths and normal lines of the scanned points. Each group is fitted to geometric original drawings, and the fitted geometric original drawings are extended and are crossed, whereby a three-dimensional model is constructed.

In the invention disclosed in Japanese Unexamined Patent Application Laid-open No. 2004-272459, segments (triangular polygons) are formed from three-dimensional point cloud position data, and edges and planes are extracted based on continuity, directions of normal lines, or distance, of adjacent polygons. Then, the three-dimensional point cloud position data of each segment is converted into a flat plane equation or a curved plane equation by the least-squares method and is grouped by planarity and curvature, whereby a three-dimensional model is constructed.

In the invention disclosed in Japanese Unexamined Patent Application Laid-open No. 2005-024370, two-dimensional rectangular areas are set for three-dimensional point cloud position data, and synthesized normal vectors of measured points in the rectangular areas are obtained. All of the measured points in the rectangular area are rotationally shifted so that the synthesized normal vector corresponds to a z-axis direction. Standard deviation $\sigma$ of z value of each of the measured points in the rectangular area is calculated. Then, when the standard deviation $\sigma$ exceeds a predetermined value, the measured point corresponding to the center point in the rectangular area is processed as noise.

In a case of obtaining three-dimensional point cloud position data by using a laser scanner, three-dimensional point cloud position data of a part behind an object cannot be obtained because the part is in the shadow of the object when seen from the laser scanner. Such generation of a shadow part is called "occlusion". The three-dimensional point cloud position data of the shadow part, which could not be obtained, can be obtained by changing the position to a position from which laser light can be emitted to the shadow part and by scanning again.

In this case, in order to solve the occlusion by this method, a processing of position adjustment is required so as to use from several tens of thousands to tens of millions of three-dimensional point cloud position data obtained at each of two positions. This processing is complicated and takes a long time to complete.

In order to adjust the positions, plural targets may be preliminarily attached to the object so as to clarify matching points between the two sets of three-dimensional point cloud position data. Then, the positions may be adjusted between the two sets of three-dimensional point cloud position data, based on the targets. Since targets must be attached on the object in this method, for example, when a tall structure or the like is to be measured, work at high places is required, and stages for the work at high places are difficult to set. Thus, there may be cases in which targets are not easily attached.

SUMMARY OF THE INVENTION

In view of these circumstances, an object of the present invention is to provide a technique of efficient processing for handling three-dimensional point cloud position data that are obtained at different viewpoints.

According to a first aspect of the present invention, the present invention provides a three-dimensional point cloud position data processing device including a three-dimensional point cloud position data obtaining unit, a plane extracting unit, a relative position calculating unit, and a matching plane identifying unit. The three-dimensional point cloud position data obtaining unit obtains first and second three-dimensional point cloud position data of an object, which are obtained at a first viewpoint and at a second viewpoint, respectively. The plane extracting unit adds identical labels to points in the same planes and extracts plural first planes and plural second planes, based on the first and the second three-dimensional point cloud position data, respectively. The first planes form the object viewed from the first viewpoint, and the second planes form the object viewed from the second viewpoint. The relative position calculating unit calculates a relative position between a target plane and each of the other planes at each location with respect to each of the first planes and the second planes. The matching plane identifying unit compares the relative positions of the first planes and the relative positions of the second planes and identifies a pair of the first plane and the second plane, which are most similar in the relative positions, as matching planes between the first planes and the second planes.

In the first aspect of the present invention, the positional relationship between a target plane and each surrounding plane is used as a method for identifying matching planes between the planes of the first three-dimensional point cloud position data (obtained from the first viewpoint) and the planes of the second three-dimensional point cloud position data (obtained from the second viewpoint). That is, a positional relationship between a plane (target plane) that forms the object and each of the other planes strongly relates to the shape of the object and the position of the target plane on the object. Thus, there is a very high probability that the positional relationship is specific for the target plane and differentiates the target plane from the other planes. In view of this, the relative position between the target plane and each of the other planes is used as a parameter that characterizes the target plane and that differentiates the target plane from the other planes.

The relative position between the target plane and each of the other planes is specific for the target plane and is thereby not changed regardless of the viewpoints as long as the relevant planes are the same. By utilizing this function, in the first aspect of the present invention, the relative positions of a particular plane (target plane), which is viewed from the first viewpoint, and the relative positions of a particular plane (target plane), which is viewed from the second viewpoint, are compared. The second viewpoint is different from the first viewpoint. Then, a pair of planes that have the smallest difference in the relative positions (in other words, a pair of planes that are most similar) is calculated. As a result, a pair of planes that have the same or very similar characteristics is extracted and is identified as matching planes. In addition, in the first aspect of the present invention, the relative position is calculated at each location, whereby the target plane is more strongly characterized, and accuracy of identifying the matching planes is increased.

According to this method, matching planes are identified by comparing the relative positions that clearly characterize the target planes, and the matching planes are identified with high accuracy. Moreover, the amount of data necessary for processing planes is much smaller than that of the original three-dimensional point cloud position data. Thus, the processing is performed with a very small amount of calculation compared with a case of comparing the original three-dimensional point cloud position data of the two viewpoints.

According to a second aspect of the present invention according to the first aspect of the present invention, the relative position calculating unit may calculate a correlation data group with respect to each of the first planes and the second planes. The correlation data group represents a positional relationship in a three-dimensional space between the target plane and each of the other planes. In addition, the matching plane identifying unit may evaluate the similarity between the correlation data groups of the first planes and the correlation data groups of the second planes.

In the second aspect of the present invention, the positional relationship in the three-dimensional space between a particular plane (hereinafter called a "target plane") and each of the other planes, which are viewed from the first viewpoint, is used as a parameter that characterizes the target plane. The positional relationship is expressed by the correlation data group. The correlation data group uses matrix data that show relationships of three-dimensional coordinates between the target plane and the other planes, which are viewed from the first viewpoint, or uses a data group of three-dimensional coordinates of the other planes based on the target plane.

Since there are plural other planes, the positional relationship between the target plane and each of the other planes in the three-dimensional space characterizes the position of the target plane on the object with a specific shape. This tendency is stronger when the shape of the object is more complicated. Thus, the correlation data group is substantially identification information which only the target plane has, that is, identification information that differentiates a particular target plane from the other planes. By utilizing this function, the correspondence relationship between the plane viewed from the first viewpoint and the plane viewed from the second viewpoint, is determined. That is, with respect to the "correlation data group that determines the three-dimensional positional relationship between a target plane and the other plane", the correlation data group of each plane viewed from the first viewpoint and the correlation data group of each plane viewed from the second viewpoint are compared. Then, planes having the most similar correlation data group are identified as matching planes (the same plane) that are viewed from the first viewpoint and the second viewpoint.

As described above, when the object is viewed from a particular viewpoint, the "correlation data group that determines the three-dimensional positional relationship between a target plane and the other plane" is specific information for the target plane. The correlation data group characterizes the target plane and enables to differentiate the target plane from the other planes. The relationship between the target plane and each of the other planes is not changed even when the viewpoint is changed, because the object is viewed simply by being rotated. Therefore, the "correlation data group that determines the three-dimensional positional relationship between a target plane and the other plane" of the matching planes are the same or are very similar, though they are obtained at different viewpoints. Thus, by evaluating similarity in the correlation data group between planes viewed from two different viewpoints and identifying a pair of planes that are most similar, matching planes are searched from the planes, which are viewed from the two different positions, at high accuracy. It should be noted that any planes that form the object can be used as the other planes as long as they are different from the target plane. For example, a plane adjacent to the target plane or a plane distant from the target plane may be selected as the other plane. In addition, the number of the other planes is desirably plural because the searching accuracy is increased when the number of the other planes is larger.

This technique is based on the comparison of the parameters that characterize planes originating from the shape of the object, whereby the matching planes are identified by the calculation at high accuracy. In other words, a plane viewed from the first viewpoint and a plane viewed from the second viewpoint are matched by the calculation at high accuracy. Moreover, the amount of data of the planes is smaller than that of the original three-dimensional point cloud position data. Thus, the amount of the calculation is small compared with a case of directly processing the three-dimensional point cloud position data, and the processing is performed at higher speed.

According to a third aspect of the present invention according to the second aspect of the present invention, the correlation data group of the first plane may be a data group that represents a distribution of distance between a projecting plane and each of the target plane and the other planes of the first planes. This projecting plane has a particular relationship with the target plane in the first planes. In addition, the correlation data group of the second plane may be a data group that represents a distribution of distance between a projecting plane and each of the target plane and the other planes of the second planes. This projecting plane has a particular relationship with the target plane in the second planes.

According to the third aspect of the present invention, with respect to each of the viewpoints, the target plane and the other planes are projected on the projecting plane, and a distance between the projecting plane and each of the target plane and the other planes is calculated. The calculated values form the "correlation data group that determines the three-dimensional positional relationship between the target plane and the other plane". For example, the projecting plane may be gridded, and then the correlation data group may be formed of matrix data that represents a distance between the projected plane and each grid point in a normal direction. According to this technique, the correlation in the depth direction of the target plane and the other planes is quantitatively obtained with a small amount of data, whereby the matching planes are searched at high accuracy even though the amount of calculation is small. The target plane and the projecting plane may have the following particular relationship. The normal vector of the target plane is aligned with the normal vector of the projecting plane, and the center of gravity of the target plane is made coincide with that of the projecting plane when viewed from the normal vector direction. Then, the distance between the target plane and the projecting plane is set at a predetermined value.

According to a fourth aspect of the present invention according to the third aspect of the present invention, the matching plane identifying unit may put a particular plane of the first planes on a particular plane of the second planes so that centers of gravity thereof coincide with each other. Then, the matching plane identifying unit may calculate a difference of value at each location in the correlation data group between the particular planes and identify a pair of planes having the smallest difference as the matching planes.

According to a fifth aspect of the present invention according to one of the first to the fourth aspect of the present invention, the three-dimensional point cloud position data processing device may further include a similarity evaluating unit that evaluates similarity between the first planes and the second planes based on properties thereof. In this case, the relative position calculating unit processes pairs of the first planes and the second planes that are determined to be similar by the similarity evaluating unit. According to the fifth aspect of the present invention, since pairs of the planes that would be evaluated for identifying the matching planes are preliminary limited, the processing is more efficiently performed.

According to a sixth aspect of the present invention according to the fifth aspect of the present invention, the similarity between the first planes and the second planes is evaluated based on at least one of the area and the shape thereof. According to the sixth aspect of the present invention, potential planes for the matching planes are limited by relatively simple calculation, and the processing is thereby more efficiently performed.

According to a seventh aspect of the present invention according to one of the first to the sixth aspect of the present invention, the three-dimensional point cloud position data processing device may further include a first positioning unit. The first positioning unit adjusts positions between a coordinate system for the first viewpoint and a coordinate system for the second viewpoint, based on the positions of the centers of gravity and the normal vectors of the matching planes which are identified by the matching plane identifying unit.

According to an eighth aspect of the present invention according to the seventh aspect of the present invention, the first positioning unit may adjust the positions between the coordinate system for the first viewpoint and the coordinate system for the second viewpoint, based on the entirety or a part of contours of the matching planes. According to the eighth aspect of the present invention, the positions are adjusted by using the entirety or a part of the contours (including a corner portion) of the matching planes, which are characteristic points that characterize them. Thus, the positions are adjusted at high accuracy.

According to a ninth aspect of the present invention according to the seventh or the eighth aspect of the present invention, the three-dimensional point cloud position data processing device may further include a second positioning unit. The second positioning unit adjusts positions between the first planes and the second planes other than the matching planes, based on results of the processing in the first positioning unit. According to the ninth aspect of the present invention, the positions between the first planes and the second planes other than the matching planes are adjusted. Thus, the positions between the three-dimensional point cloud position data obtained at two different viewpoints are adjusted at higher accuracy.

According to a tenth aspect of the present invention according to the ninth aspect of the present invention, the second positioning unit may adjust positions between the planes and points or the positions between the planes.

According to an eleventh aspect of the present invention according to one of the first to the tenth aspect of the present invention, the three-dimensional point cloud position data processing device may further include a three-dimensional model-constructing unit. The three-dimensional model-constructing unit constructs a three-dimensional model of the object viewed from a particular viewpoint, based on the first and the second three-dimensional point cloud position data in which the positions are adjusted by the second positioning unit. According to the eleventh aspect of the present invention, a three-dimensional model is obtained while generation of occlusion is decreased.

According to a twelfth aspect of the present invention according to the first aspect of the present invention, the relative position calculating unit may calculate directional correlation between adjacent planes of the first planes and directional correlation between adjacent planes of the second planes. In this case, the matching plane identifying unit may identify the matching planes based on similarity between the directional correlation of the adjacent planes of the first planes and the directional correlation of the adjacent planes of the second planes. According to the twelfth aspect of the present invention, the relative position between the target plane and the other plane is determined by directional correlation between the target plane and the adjacent plane.

According to a thirteenth aspect of the present invention, the present invention also provides a three-dimensional point cloud position data processing system including a three-dimensional point cloud position data obtaining means, a plane extracting means, a relative position calculating means, and a matching plane identifying means. The three-dimensional point cloud position data obtaining means obtains first and second three-dimensional point cloud position data of an object, which are obtained at a first viewpoint and at a second viewpoint, respectively. The plane extracting means adds identical labels to points in the same planes and extracts plural first planes and plural second planes, based on the first and the second three-dimensional point cloud position data, respectively. The first planes form the object viewed from the first viewpoint, and the second planes form the object viewed from the second viewpoint. The relative position calculating means calculates a relative position between a target plane and each of the other planes at each location with respect to each of the first planes and the second planes. The matching plane identifying means compares the relative positions of the first planes and the relative positions of the second planes and identifies a pair of the first plane and the second plane, which are most similar in the relative positions, as matching planes between the first planes and the second planes.

The invention according to the thirteenth aspect of the present invention is obtained by using the invention according to the first aspect of the present invention as an invention of a system. In the thirteenth aspect of the present invention, each means may exist at distant locations. In this case, each means is connected via a communication means so as to function as a whole system.

According to a fourteenth aspect of the present invention, the present invention also provides a three-dimensional point cloud position data processing method including a three-dimensional point cloud position data obtaining step, a plane-extracting step, a relative position calculating step, and a matching plane identifying step. In the three-dimensional point cloud position data obtaining step, first and second three-dimensional point cloud position data of an object, which are obtained at a first viewpoint and at a second viewpoint, respectively, are obtained. In the plane-extracting step, identical labels are added to points in the same planes, and plural first planes and plural second planes are extracted, based on the first and the second three-dimensional point cloud position data, respectively. The first planes form the object viewed from the first viewpoint, and the second planes form the object viewed from the second viewpoint. In the relative position calculating step, a relative position between a target plane and each of the other planes is calculated at each location with respect to each of the first planes and the second planes. In the matching plane identifying step, the relative positions of the first planes and the relative positions of the second planes are compared, and a pair of the first plane and the second plane, which are most similar in the relative positions, is identified as matching planes between the first planes and the second planes.

According to a fifteenth aspect of the present invention, the present invention further provides a program that is read and is executed by a computer so as to run the following steps. The steps include a three-dimensional point cloud position data obtaining step, a plane-extracting step, a relative position calculating step, and a matching plane identifying step. In the three-dimensional point cloud position data obtaining step, first and second three-dimensional point cloud position data of an object, which are obtained at a first viewpoint and at a second viewpoint, respectively, are obtained. In the plane-extracting step, identical labels are added to points in the same planes, and plural first planes and plural second planes are extracted, based on the first and the second three-dimensional point cloud position data, respectively. The first planes form the object viewed from the first viewpoint, and the second planes form the object viewed from the second viewpoint. In the relative position calculating step, a relative position between a target plane and each of the other planes is calculated at each location with respect to each of the first planes and the second planes. In the matching plane identifying step, the relative positions of the first planes and the relative positions of the second planes are compared, and a pair of the first plane and the second plane, which are most similar in the relative positions, is identified as matching planes between the first planes and the second planes.

Effects of the Invention

According to the first aspect of the present invention, matching planes between the two different viewpoints are calculated. The calculated matching planes determine the relationship between the first three-dimensional point cloud position data and the second three-dimensional point cloud position data. Thus, the positions can be adjusted to use the first and the second three-dimensional point cloud position data, which are obtained at the two viewpoints, in a common coordinate system. In this case, the enormous amounts of the first and the second three-dimensional point cloud position data need not be compared, whereby the processing is efficiently performed.

BRIEF DESCRIPTION OF THE DRAWINGS

FIG. 14 is a conceptual diagram showing examples of histograms that are used for calculating matching planes by using angular information of planes.

DETAILED DESCRIPTION OF THE PREFERRED EMBODIMENTS

1. First Embodiment

An example of a three-dimensional point cloud position data processing device using the present invention will be described with reference to figures hereinafter. The three-dimensional point cloud position data contain three-dimensional coordinate data of each measured point of an object in the following descriptions. The system of three-dimensional coordinates uses an orthogonal coordinate system or a polar coordinate system.

Figure 1:
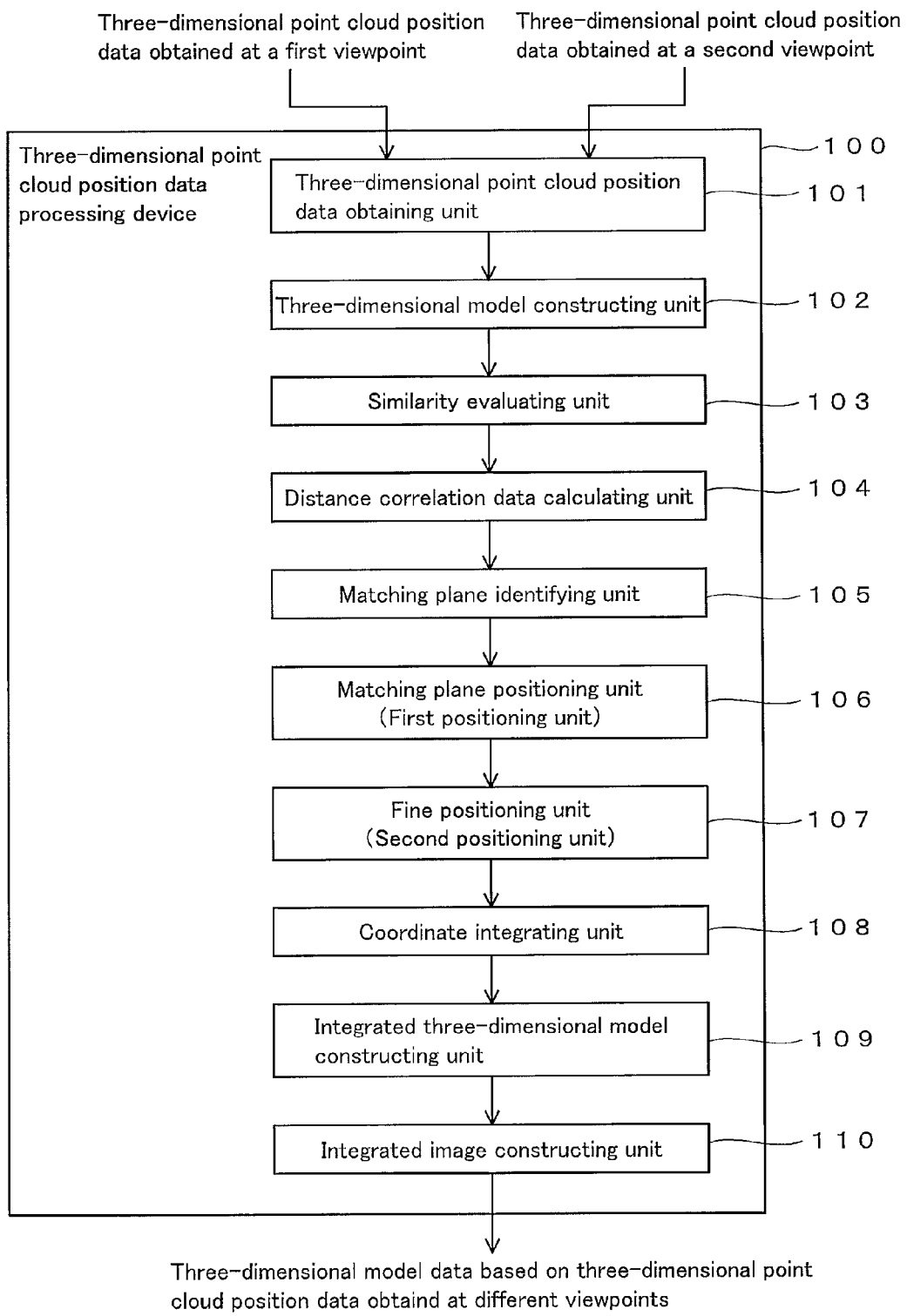
FIG. 1 is a block diagram of an embodiment.

FIG. 1 shows a three-dimensional point cloud position data processing device 100 (hereinafter simply called "device 100"). The device 100 has a function of adjusting positions between first and second three-dimensional point cloud position data of an object, which are obtained at two different viewpoints. The device 100 also has a function of constructing a three-dimensional model of the object by integrally using the first and the second three-dimensional point cloud position data of the object, after the positions are adjusted. The device 100 is constructed software-like in a personal computer. The program which constructs the device 100 in the personal computer is installed in the personal computer. It should be noted that this program can be stored in a server or an appropriate recording medium and can be provided therefrom.

The personal computer to be used includes an input unit such as a keyboard or a touchscreen, a display unit such as a liquid crystal display, a GUI (Graphical user interface) function unit, a CPU and the other dedicated processing units, a semiconductor memory, a hard disk recording unit, a disk recording device driving unit and its interface unit, an interface unit, and a communication interface unit, as necessary. The GUI function unit is a user interface for integrating the input unit and the display unit. The disk recording device driving unit transfers information with a storage media such as an optical disk or the like. The interface unit transfers information with a portable storage media such as a USB memory or the like. The communication interface unit performs wireless communication or wired communication. The personal computer may be a notebook type, a portable type, a desktop type, or the like, but the type is not limited thereto. Instead of using a general-purpose personal computer, a dedicated computer can be used. The device 100 can be formed of dedicated hardware using an ASIC (Application Specific Integrated Circuit), a PLD (Programmable Logic Device) such as a FPGA (Field Programmable Gate Array), or the like.

The device 100 is connected to a laser scanner that obtains three-dimensional point cloud position data of an object. The laser scanner inputs at least two groups of three-dimensional point cloud position data, which are obtained at different viewpoints. The laser scanner irradiates a laser beam onto an object and receives light that is reflected by the object, thereby obtaining information of a distance from a mounted position (viewpoint) thereof to a measurement point, a direction, and an elevation angle or a depression angle. Then, the laser scanner calculates information relating to three-dimensional positional coordinates of the measured point based on the information. The laser scanner also obtains information of intensity, color, color phase, saturation of the light reflected from the measurement point. The laser scanner calculates point cloud position data containing three-dimensional coordinate values, based on the above information, and outputs the data to the device 100. The detailed structure of the laser scanner will be exemplified later.

The three-dimensional point cloud position data can be obtained at two different viewpoints by using one laser scanner or two laser scanners. The number of the different viewpoints is basically two, but can be three, four, or more. In the following descriptions, a basic case of processing three-dimensional point cloud position data obtained at two different viewpoints is exemplified. For the method for obtaining the three-dimensional point cloud position data other than the use of the laser scanner, image processing software can be used to extract them from a stereoscopic photographic image.

The device 100 shown in FIG. 1 includes a three-dimensional point cloud position data obtaining unit 101, a three-dimensional model-constructing unit 102, a similarity evaluating unit 103, and a distance correlation data calculating unit 104. The device 100 also includes a matching plane identifying unit 105, a matching plane positioning unit 106, a fine positioning unit 107, a coordinate integrating unit 108, an integrated three-dimensional model-constructing unit 109, and an integrated image constructing unit 110.

The three-dimensional point cloud position data obtaining unit 101 obtains three-dimensional point cloud position data from the above-described laser scanner. In this case, first and second three-dimensional point cloud position data relating to the same object, which are obtained at two different viewpoints, are input to the three-dimensional point cloud position data obtaining unit 101. Alternatively, the three-dimensional point cloud position data can be calculated at the three-dimensional point cloud position data obtaining unit 101 based on the output from the laser scanner.

The device 100 includes the three-dimensional model-constructing unit 102 which performs calculation of non-plane areas, removal of non-plane areas, labeling, calculation of characteristic portions such as contours, construction of a three-dimensional model formed of the contours, and associated calculations. The three-dimensional model is an image of a visualized three-dimensional structure of an object, which contours are represented with a line figure. The contours are outlines that form an outer shape of the object and that are necessary to visually understand the appearance of the object. In particular, bent portions and portions at which curvatures suddenly decrease, are used as the contours. The contours are not only outside frame portions but also edge portions, which characterize convexly protruding portions, and edge portions, which characterize concavely recessed portions (for example, grooved portions). The contours provide what is called a line figure, whereby an image that enables easily understanding of the appearance of the object is displayed. The three-dimensional model contains not only information of the above-described lines but also information of points that represent characteristic portions when the appearance of the object is visually understood. The three-dimensional model can also be expressed by a polyhedron that is formed of labeled planes.

Figure 2:
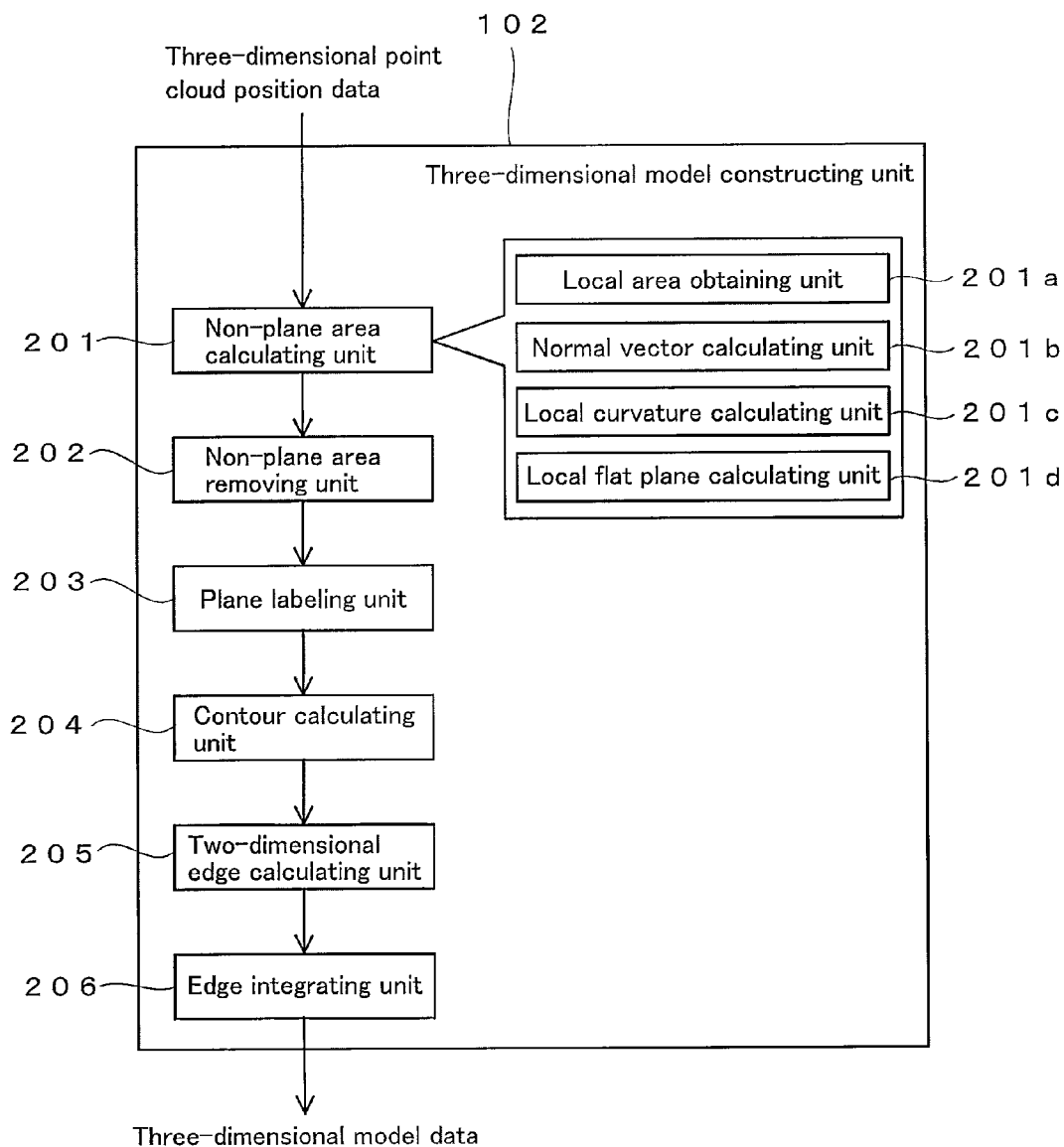
FIG. 2 is a block diagram of an embodiment.

The details of the three-dimensional model-constructing unit 102 in FIG. 1 will be described hereinafter. FIG. 2 shows a block diagram of the three-dimensional model-constructing unit 102. The three-dimensional model-constructing unit 102 includes a non-plane area calculating unit 201, a non-plane area removing unit 202, a plane labeling unit 203, a contour calculating unit 204, a two-dimensional edge calculating unit 205, and an edge integrating unit 206. Each of these functional units will be described as follows.

The non-plane area calculating unit 201 includes a local area obtaining unit 201a for obtaining a local area, a normal vector calculating unit 201b for calculating a normal vector of the local area, a local curvature calculating unit 201c for calculating a local curvature of the local area, and a local flat plane calculating unit 201d for calculating a local flat plane which fits to the local area.

The local area obtaining unit 201a obtains a square area (grid-like area) of approximately 3 to 7 pixels on a side, which has a target point at the center, as a local area, based on the three-dimensional point cloud position data. The normal vector calculating unit 201b calculates a normal vector of each point in the local area obtained by the local area obtaining unit 201a. In the calculation of the normal vector, the three-dimensional point cloud position data in the local area is used, and a normal vector of each point is calculated. This calculation is performed on the entirety of the three-dimensional point cloud position data. That is, the three-dimensional point cloud position data is segmented into numerous local areas, and a normal vector of each point in each of the local areas is calculated.

The local curvature calculating unit 201c calculates a variation (local curvature) of the normal vectors in the local area. In this case, in a target local area, an average (mNVx, mNVy, mNVz) of intensity values (NVx, NVy, NVz) of the three axial components of each normal vector is calculated. Next, a standard deviation (StdNVx, StdNVy, StdNVz) is calculated based on the above calculated result. Then, a square-root of a sum of squares of the standard deviation is calculated as a local curvature (crv) (First Formula).

$$\text{Local Curvature}=(StdNVx^2+StdNVy^2+StdNVz^2)^{1/2} \quad \text{First Formula}$$

The local flat plane calculating unit 201d calculates a local flat plane fitted (approximated) to the local area. In this calculation, an equation of a local flat plane is obtained from three-dimensional coordinates of each point in a target local area. The local flat plane is made so as to fit to the target local area. In this case, the equation of the local flat plane that fits to the target local area is obtained by the least-squares method. In particular, plural equations of different flat planes are obtained and are then compared, whereby the equation of the local flat plane that fits to the target local area is obtained. When the target local area is a flat plane, a local flat plane coincides with the local area. These calculations are repeated until they are performed on the entirety of the three-dimensional point cloud position data by sequentially forming a local area, whereby normal vectors, a local flat plane, and a local curvature, of each of the local areas are obtained.

The non-plane area removing unit 202 removes points of non-plane areas based on the normal vectors, the local flat plane, and the local curvature, of each of the local areas. That is, in order to extract planes (flat planes and curved planes), portions (non-plane areas), which can be preliminarily identified as non-planes, are removed. The non-plane areas are areas other than the flat planes and the curved planes, but there may be cases in which curved planes with high curvatures are included depending on threshold values of the following methods (1) to (3).

The non-plane area removing unit 202 removes three-dimensional point cloud position data of the calculated non-plane areas from the three-dimensional point cloud position data obtained by the three-dimensional point cloud position data obtaining unit 101. The removal of the non-plane areas is performed by at least one of the following three methods. In this embodiment, evaluations according to the following methods (1) to (3) are performed on all of the local areas. If the local area is identified as a non-plane area by at least one of the three methods, it is extracted as a local area that forms a non-plane area. Then, three-dimensional point cloud position data relating to points that form the extracted non-plane area are removed.

(1) Portion with High Local Curvature: The local curvature is compared with a predetermined threshold value, and a local area having a local curvature that exceeds the threshold value is identified as a non-plane area. The local curvature indicates variation of normal vectors of the target point and surrounding points. Thus, the local curvature is small for planes (flat planes and curved planes with small curvatures) and is large for areas other than the planes (non-planes). Accordingly, when the local curvature is greater than the predetermined threshold value, the target local area is identified as a non-plane area.

(2) Fitting Accuracy of Local Flat Plane: A distance between each point in a target local area and a corresponding local flat plane is calculated. When an average of these distances is greater than a predetermined threshold value, the target local area is identified as a non-plane area. That is, when a target local area differs from the shape of a flat plane, and the difference is greater, the distance between each point in the target local area and the corresponding local flat plane is greater. By using this function, degree of non-planarity of the target local area is evaluated.

(3) Check of Coplanarity: The directions of local flat planes that correspond to adjacent local areas are compared. When the difference in the directions of the local flat planes exceeds a threshold value, the adjacent local areas are identified as non-plane areas. In particular, two local flat planes that fit to two target local areas, respectively, have normal vectors and a connecting vector that connects center points in the local flat planes. When an inner product of each of the normal vectors and the connecting vector is zero, both of the local flat planes are determined to exist in the same plane. When the inner products are greater, the two local flat planes are more separated and are not in the same plane.

A local area that is identified as a non-plane area by at least one of the three methods (1) to (3) is extracted as a local area that forms a non-plane area. Then, three-dimensional point cloud position data relating to points that form the extracted local area are removed from three-dimensional point cloud position data to be calculated. As noted above, non-plane areas are removed. Since the removed three-dimensional point cloud position data may be used in later steps, they may be stored in an appropriate storage area or may be set so as to be identified from the remaining three-dimensional point cloud position data, in order to make them available later.

Next, the functions of the plane labeling unit 203 will be described. The plane labeling unit 203 is an example of a plane extracting unit. The plane labeling unit 203 performs plane labeling on the three-dimensional point cloud position data, in which the three-dimensional point cloud position data of the non-plane areas are removed, based on continuity of normal vectors. In particular, when an angle difference of normal vectors of a target point and an adjacent point is not more than a predetermined threshold value, identical labels are added to these points. By repeating this processing, identical labels are added to each of connected flat planes and connected curved planes with small curvatures, whereby each of the connected flat planes and the connected curved planes are made identifiable as one plane. After the plane labeling is performed, whether the label (plane) is a flat plane or a curved plane with a small curvature is determined by using the angular difference of the normal vectors and standard deviations of the three axial components of the normal vectors. Then, identifying data for identifying the result of this determination are linked to each of the labels.

Next, labels (planes) with small areas are removed as noise. The removal of noise may be performed at the same time as the plane labeling. In this case, while the plane labeling is performed, the number of the identical labels (number of points forming the identical label) is counted, and labels that have points at not more than a predetermined number are cancelled. Then, a label of the nearest plane is added to the points with no label at this time, thereby extending the plane that has been labeled.

That is, an equation of a labeled plane is obtained, and a distance between the labeled plane and a point with no label is calculated. When there are plural labels (planes) around the point with no label, a label having the smallest distance from the point is selected. If points with no label still exist, each of the threshold values in the removal of non-plane areas, the removal of noise, and the extension of label, is changed, and related processing is performed again. For example, by increasing the threshold value of the local curvature in the removal of non-plane areas, fewer points are extracted as non-planes. In some cases, by increasing the threshold value of the distance between the point with no label and the nearest plane in the extension of label, labels are added to more of the points with no label.

Then, when planes have different labels but are in the same planes, the different labels of the planes are integrated. That is, identical labels are added to planes that have the same position or the same direction, even if the planes are not continuous. In particular, by comparing the positions and the directions of the normal vectors of each plane, discontinuous same planes are extracted, and the labels thereof are integrated into one of the labels thereof. These are the functions of the plane labeling unit 203.

According to the function of the plane labeling unit 203, the amount of data to be dealt with is reduced, whereby the three-dimensional point cloud position data is processed at higher speed. In addition, the amount of necessary memory is reduced. Moreover, three-dimensional point cloud position data of passersby and passing vehicles during measurement are removed as noise.

The contour calculating unit 204 calculates (estimates) a contour based on three-dimensional point cloud position data of adjacent planes. A specific calculation method will be described hereinafter. The contour calculating unit 204 obtains a line of intersection of adjacent planes that hold non-plane areas therebetween, and uses it as a contour. In some cases, plural local flat planes may be fitted to the non-plane areas between the adjacent planes and be connected, thereby approximating the non-plane areas. This can be taken as a method of approximating the non-plane areas by a polyhedron formed of the plural local flat planes. In this case, the local flat planes are connected from the adjacent planes, and a line of intersection of finally adjacent local flat planes is calculated as a contour. The calculation of the contour clarifies the image of the contour of the object.

Next, the two-dimensional edge calculating unit 205 will be described. The two-dimensional edge calculating unit 205 extracts provisional edges from within areas of two-dimensional images corresponding to segmented (divided) planes by a publicly known edge extracting operator such as Laplacian, Prewitt, Sobel, or Canny, based on intensity distribution of light reflected from the object. That is, since a two-dimensional edge is recognized by difference of intensity in a plane, the difference of the intensity is extracted from information of the strength of the reflected light, and a contour of the intensity is extracted as a provisional edge by setting a threshold value to the extracting condition. Then, a height (z value) of a three-dimensional coordinate of a point forming the provisional edge is compared with that of a point forming a contour (three-dimensional edge) in the vicinity of the provisional edge. When this difference is not more than a predetermined threshold value, the provisional edge is extracted as a two-dimensional edge. That is, whether the point forming the provisional edge extracted from the two-dimensional image is on the segmented plane or not is determined, and when it is on the segmented plane, the provisional edge is determined as a two-dimensional edge.

After the two-dimensional edge is calculated by the two-dimensional edge calculating unit 205, it is integrated with the contour that is calculated by the contour calculating unit 204. This processing is performed by the edge integrating unit 206. Thus, edges based on the three-dimensional point cloud position data are extracted. This edge extraction extracts lines (contours) for forming appearance of the object in recognizing the object and provides data of three-dimensional models.

Figure 3A:
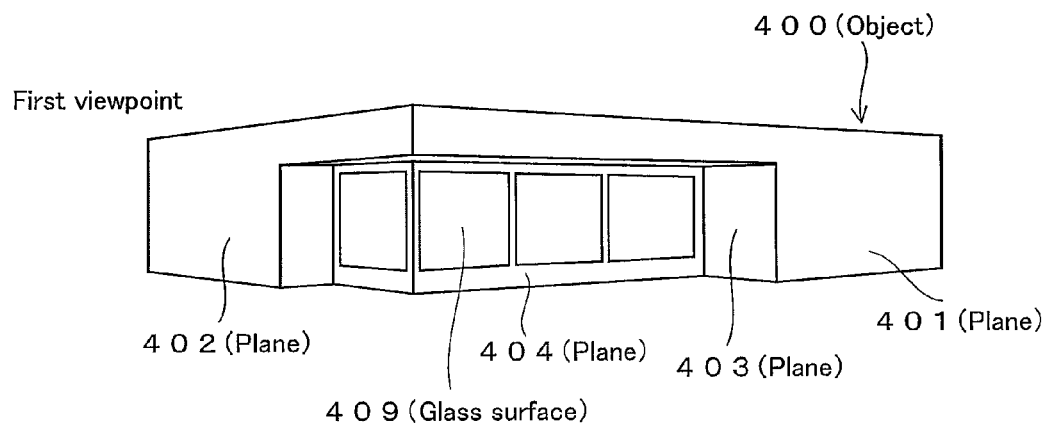
FIGS. 3A and 3B show examples of three-dimensional models that are obtained at two different viewpoints.
Figure 3B:
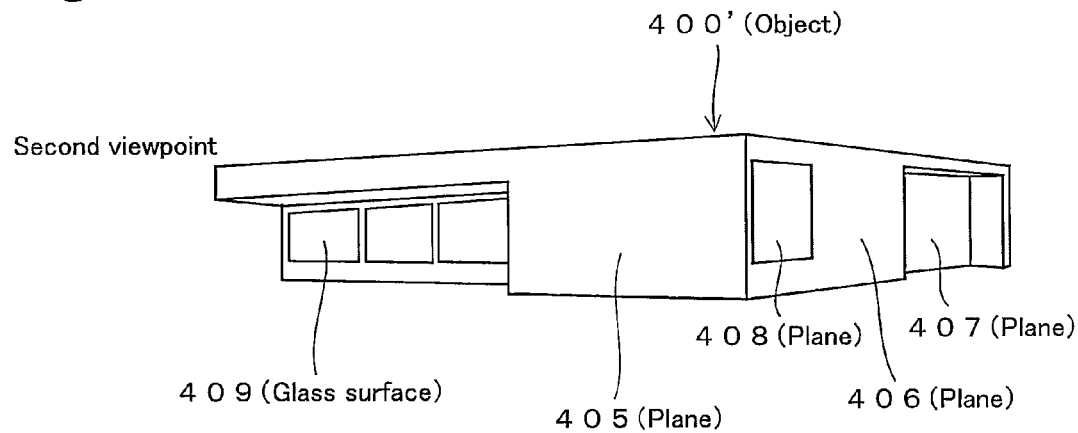

FIGS. 3A and 3B show examples of three-dimensional models in the form of models of objects 400 and 400' (in this case, a one-story building) that are viewed from different viewpoints. In the examples, the portion indicated by the reference numeral 409 is a glass surface, whereby laser light is transmitted, and three-dimensional point cloud position data cannot be obtained (or cannot be correctly obtained).

In this embodiment, three-dimensional point cloud position data that are measured at two different viewpoints are input to the device 100. Accordingly, the three-dimensional model-constructing unit 102 constructs three-dimensional models that are obtained from the two different viewpoints, as exemplified in FIGS. 3A and 3B. As exemplified in FIGS. 3A and 3B, the two sets of three-dimensional models are obtained by digitalizing the same object and are expressed by line figures. At this stage of the three-dimensional models obtained by the three-dimensional model-constructing unit 102, the correspondence relationship therebetween is not clear because the three-dimensional point cloud position data obtained from the two viewpoints are not correlated (positions thereof are not adjusted). In view of this, the objects expressed by the three-dimensional models have different reference numerals of 400 and 400' although the objects are the same in FIGS. 3A and 3B.

The similarity evaluating unit 103 in FIG. 1 performs the following processing. As noted above, the three-dimensional model-constructing unit 102 constructs three-dimensional models that are viewed from two different viewpoints. In order to construct the three-dimensional models, as described with reference to FIG. 2, planes that form the object are extracted. That is, as shown in FIGS. 3A and 3B, the object is used as a set of plural planes (polyhedron), and the three-dimensional models are constructed with information of contours of the planes. The similarity evaluating unit 103 evaluates similarity of the planes that form the two sets of three-dimensional models that are obtained from the different viewpoints. In particular, the degree of similarity between a particular plane of the first three-dimensional model and a particular plane of the second three-dimensional model is evaluated.

The evaluation of the similarity is performed as follows. In this case, the three-dimensional models exemplified in FIGS. 3A and 3B are described as examples. First, data of the planes of each of the three-dimensional models, which are already extracted by the plane labeling unit 203 in FIG. 2, are obtained. Then, top "n" planes are selected from the planes that form each of the three-dimensional models, in order of area. The number of "n" is freely selected, but in this case, n=4 for ease of explanation. In this example, the top 4 planes 401, 402, 403, and 404 are extracted from the planes that form the three-dimensional model 400. In addition, the top 4 planes 405, 406, 407, and 408 are extracted from the planes that form the three-dimensional model 400' of the object. Thus, the target to be processed is limited based on the area.

Next, the degree of similarity (matching) of the shape between the planes 401, 402, 403, and 404 of the first group and the planes 405, 406, 407, 408 of the second group is calculated. In this case, a similarity "S" is calculated as the similarity of the shape from the following Second Formula in which $W_1$ and $H_1$ represent a width and a height of a plane of the first group, and $W_2$ and $H_2$ represent a width and a height of a plane of the second group, respectively.

$S_W = W_1/W_2 (\text{or } W_2/W_1)$ $S_H = H_1/H_2 (\text{or } H_2/H_1)$ $S = S_W \times S_H$ <span style="float:right">Second Formula</span>

In the Second Formula, one of $W_1/W_2$ and $W_2/W_1$, and one of $H_1/H_2$ and $H_2/H_1$, are selected so that the values of $S_W$ and $S_H$ are less than 1. Examples of the calculated value of the similarity for the examples of FIGS. 3A and 3B are shown in the following Tables 1 and 2.

TABLE 1

| First viewpoint | Second viewpoint | Similarity "S" (%) |
|---|---|---|
| Plane 401 | Plane 405 | 90.1 |
|  | Plane 406 | 81.6 |
|  | Plane 407 | 10.8 |
|  | Plane 408 | 3.9 |

TABLE 2

| First viewpoint | Second viewpoint | Similarity "S" (%) |
|---|---|---|
| Plane 403 | Plane 405 | 9.6 |
|  | Plane 406 | 7.5 |
|  | Plane 407 | 60.2 |
|  | Plane 408 | 42.6 |

By calculating the similarity of the shape as exemplified in Tables 1 and 2, the similarity of the planes are roughly evaluated. The processing described above is performed by the similarity evaluating unit 103. The processing of the similarity evaluating unit 103 determines that, for example, the plane 401 is similar to the plane 405 or 406, and the plane 403 is similar to the plane 407 or 408. This processing of evaluating the similarity with the shape decreases the number of pairs to be compared to examine the details of the similarity, which will be performed later, whereby the amount of calculation is decreased. In other words, pairs that do not need detailed calculations of similarity, such as the pair of the planes 401 and 408 in Table 1, are excluded, whereby the processing is more efficiently performed. For the method of examining the similarity of the shapes of the planes, the shapes of the planes can also be compared by modeling, categorizing into patterns, or simplifying.

After the processing of the similarity evaluating unit 103 is performed, the distance correlation data calculating unit 104 performs the following processing. The distance correlation data calculating unit 104 is an example of a relative position calculating unit that calculates a relative position between a target plane and the other plane. In this example, the distance correlation data calculating unit 104 calculates the similarity in further detail of the top two pairs, based on the results exemplified in Tables 1 and 2. In the examples shown in Tables 1 and 2, the pair of the planes 401 and 405, the pair of the planes 401 and 406, the pair of the planes 403 and 407, and the pair of the planes 403 and 408 are estimated to have high similarity.

Figure 4:
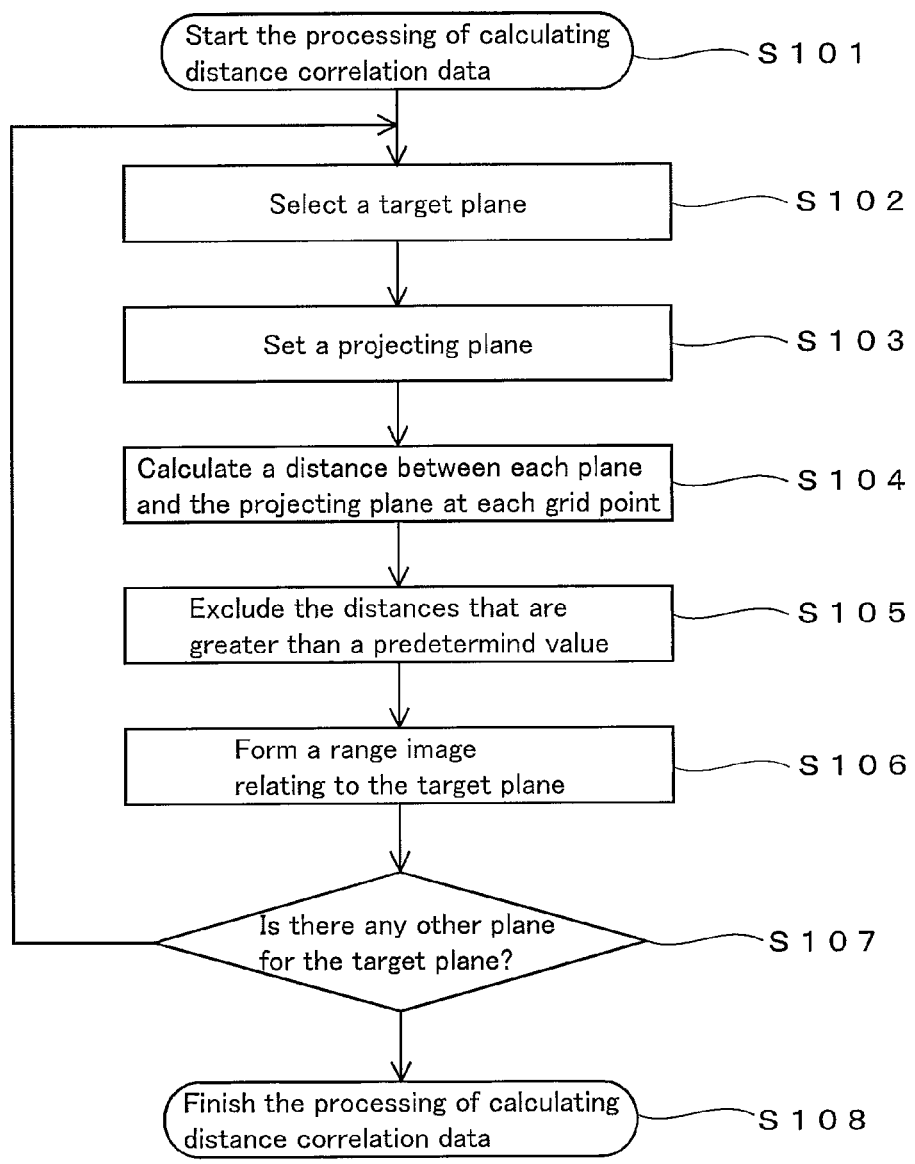
FIG. 4 is a flow chart showing an example of procedures in an embodiment.

The steps of the processing will be described by a specific example hereinafter. FIG. 4 is a flow chart showing an example of a processing that is performed by the distance correlation data calculating unit 104. When the processing is started (step S101), a target plane is selected (step S102). The target plane is selected from the pairs that are estimated to have high similarity by the similarity evaluating unit 103. In this case, an example of selecting the plane 401 as the target plane is described.

Figure 5:
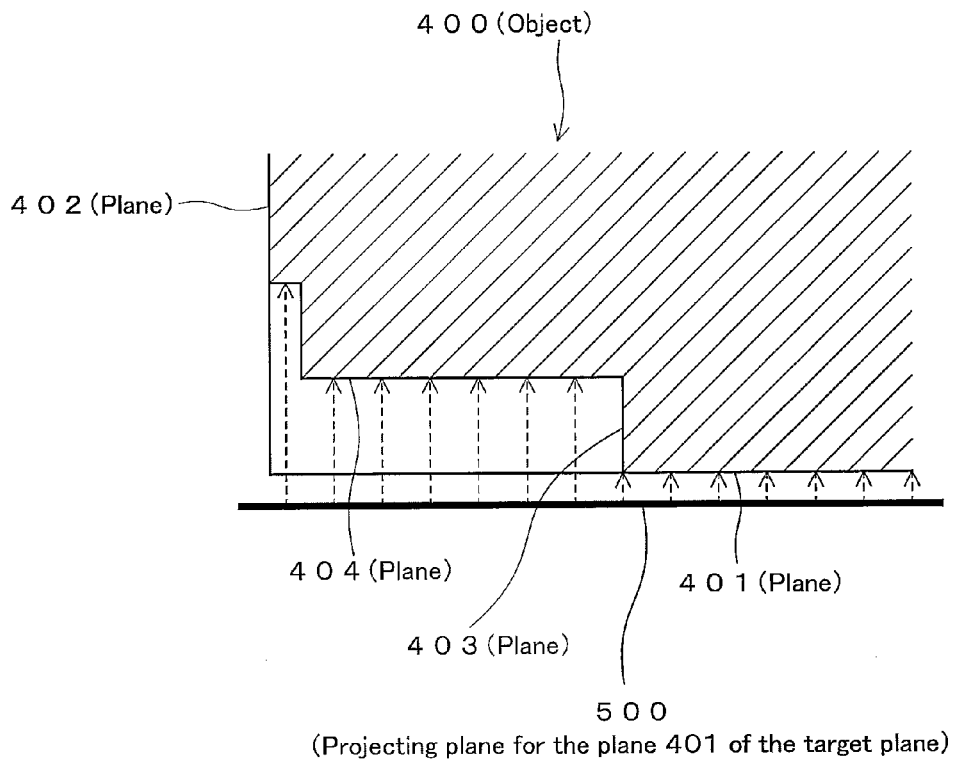
FIG. 5 is a conceptual diagram showing an example of a step for calculating a relative position between a target plane and each of the other planes at each location.

FIG. 5 is a conceptual diagram for describing the concept of the processing that is performed by the distance correlation data calculating unit 104. FIG. 5 shows an example of selecting the plane 401 as the target plane. When the plane 401 is selected as the target plane, a projecting plane 500 is set in a measurement space based on the plane 401 (step S103). The projecting plane 500 shares the center of gravity with the plane 401 and has the same normal vector as the plane 401 when viewed from the normal direction of the plane 401. The projecting plane 500 has a size that is set by extending the end of the plane 401 to 5 meters and is positioned at a distance of 5 meters from the plane 401 in front. Alternatively, the projecting plane 500 can be positioned in back of the plane 401 in the normal direction. The projecting plane 500 can also be set at the same position as the plane 401 in the normal direction. Instead of setting the normal direction of the projecting plane 500 and the normal direction of the plane 401 in the same direction, they can also be set to have a particular angular relationship. The projecting plane 500 is made so as to be much larger than the plane 401 as noted above, in order to project the other planes around the plane 401. This size is not limited to the above-described size of 5 meters and can be another value.

After the projecting plane 500 is set, each of the planes that form the object 400 is projected on the projecting plane 500. This projection is performed in the normal direction of the projecting plane 500. The planes to be projected, which form the object 400, are not limited to the planes shown in FIGS. 3A and 3B, and all planes that are labeled in the processing of the three-dimensional model-constructing unit 102 are projected. In order to decrease the amount of calculation, a threshold value may be set to the number of the points that form a plane. In this case, only planes that are formed of points of not less than the predetermined amount (that is, planes having areas of not less than the predetermined value) are processed in the above-described manner. Then, a distance between each of the planes and the projecting plane 500 is calculated at each location that is set in a grid-like shape (step S104). This distance is calculated in the normal direction of the projecting plane 500 (the normal direction of the plane 401). In this case, the grid interval (resolution) is set at 0.05 meters.

That is, a distance between the planes that overlap with each other in the normal direction is calculated with respect to each of the grid points. In particular, a distance between the projecting plane 500 and the plane 401 at each grid point in the area where they overlap each other, and a distance between the projecting plane 500 and the plane 404 at each grid point in the area where they overlap each other, are calculated in the normal direction of the projecting plane. Since the planes 402 and 403 are vertical to the projecting plane 500, distances of the nearest portions from the projecting plane 500 are calculated. By calculating the distance between the projecting plane 500 and each of the planes at each grid point in the projecting plane 500, the three-dimensional positional relationship between the plane 401 of the target plane and the other plane is quantitatively determined.

After the distance between the projecting plane 500 and each plane at each grid point is calculated, the distances that are greater than a predetermined value are removed (step S105). This is performed to exclude errors and unnecessary calculations. Thus, the following matrix data is obtained. In the matrix data, the value of the distance between the projecting plane 500 and each plane (each of the plane 401 and the surrounding other planes) in the normal direction of the projecting plane 500 is distributed in a grid-like shape. The matrix data is used as a correlation data group that shows a positional relationship between the plane 401 and each of the other planes of the object 400 in a three-dimensional space. The correlation data group is data in which the value of the distance between the projecting plane 500 and each plane at each grid point is distributed in a matrix shape. An example of the correlation data group is shown in Table 3. In this case, the coordinates $(X_n, Y_m)$ represent the position of the grid point, and $Z_{mn}$ represents the distance between the projecting plane 500 and each plane. The value of $Z_{mn}$ includes the distance between the projecting plane 500 and the plane 401 of the target plane and the distance between the projecting plane 500 and each of the other planes around the plane 401 of the target plane.

TABLE 3

|  | $Y_1$ | $Y_2$ | $Y_3$ | • | • | $Y_m$ |
|---|---|---|---|---|---|---|
| $X_1$ | $Z_{11}$ | $Z_{21}$ | $Z_{31}$ | • | • | $Z_{m1}$ |
| $X_2$ | $Z_{12}$ | $Z_{22}$ | $Z_{32}$ | • | • | $Z_{m2}$ |
| $X_3$ | $Z_{13}$ | $Z_{23}$ | $Z_{33}$ | • | • | $Z_{m3}$ |
| • | • | • | • | • | • | • |
| • | • | • | • | • | • | • |
| $X_n$ | $Z_{1n}$ | $Z_{2n}$ | $Z_{3n}$ | • | • | $Z_{mn}$ |

The correlation data group in Table 3 represents a three-dimensional relative position between the plane 401 (target plane), which forms the object 400, and each of the other planes, which form the object 400, by a distribution of the distance between the projecting plane 500 and each of the plane 401 and the other planes. In other words, in the correlation data group exemplified in Table 3, the positional relationship between the target plane and each of the other planes in a depth direction is quantitatively determined by two-dimensional distribution of the distance between the projecting plane and each of the target plane and the other planes in the depth direction. According to the correlation data group exemplified in Table 3, the three-dimensional positional relationship between the target plane and each of the other planes is quantitatively determined. The distribution of the distance from the projecting plane 500 to the plane 401 or each surrounding other plane, which forms the object 400, at each grid point shown in Table 3, strongly relates to the three-dimensional position of the plane 401 of the object 400. Thus, the distribution is a specific data cloud that enables determination of the three-dimensional position of the plane 401 of the object 400. That is, for the case in FIGS. 3A and 5, in the matrix data, the distance between the plane 401 and each of the planes 402, 403, and 404 in the depth direction is registered at each grid point on the projecting plane 500. This matrix data characterizes the three-dimensional position of the plane 401 of the object 400 with a stereoscopic shape and is specific to the plane 401. Thus, the possibility of obtaining the same matrix data for the other plane is very low and is vanishingly small in a practical sense. This tendency is further increased when the shape of the object 400 is more complicated and asymmetry is greater.

In this embodiment, a range image relating to the target plane (in this case, the plane 401) is formed based on the matrix data (step S106). The range image represents the difference in the calculated distance between the projecting plane 500 and each of the planes, which form the object 400 and overlap with the projecting plane 500 in the normal direction, at each grid point, by difference of contrasting density or the like. That is, at this stage of the processing, the distance between the projecting plane 500 and each of the planes projected thereon is calculated at each grid point on the projecting plane 500. The value of the distance with respect to each grid point is used as pixel information to form an image, whereby the range image is obtained. The range image enables determination of the three-dimensional position of the target plane of the object. For example, when two range images have higher similarity, target planes in the two range images are more likely to be the identical plane. It should be noted that the range image is used for descriptive purposes and is called an "image" because it can be used in the same manner as the image information in calculation, and it is not necessary to generate image data in practice.

Figure 6:
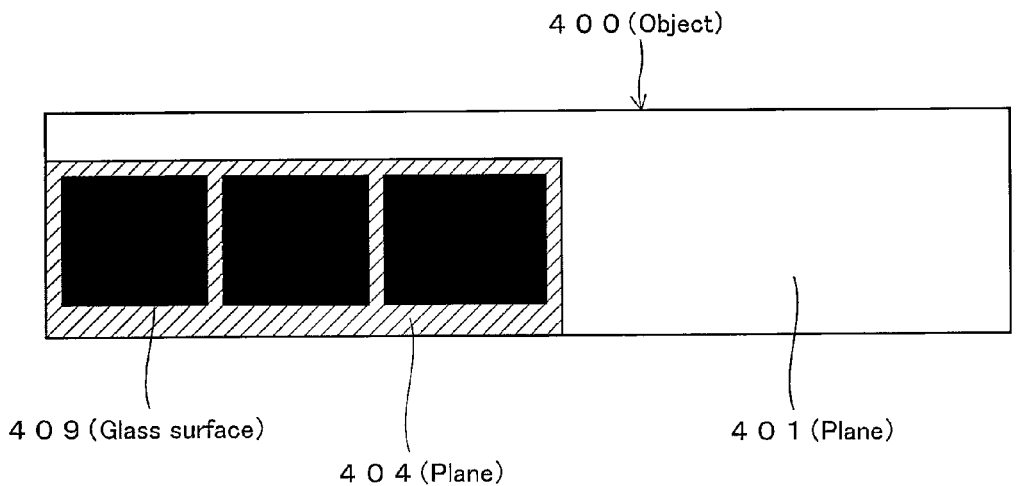
FIG. 6 is a conceptual diagram showing an example of a range image.

FIG. 6 shows an example of a range image that corresponds to the condition shown in FIG. 5. In the example in FIG. 6, a plane nearest to the projecting plane 500 in FIG. 5 is indicated by white, and a plane second nearest to the projecting plane 500 is indicated by hatching. FIG. 6 shows a condition in which the glass surface 409 is not determined as a plane and is not labeled because three-dimensional point cloud position data thereof cannot be correctly obtained. The planes 402 and 403 in FIG. 5 are not shown in FIG. 6.

After the range image is formed in the step S106, whether there is any other plane for the target plane other than the already selected plane is investigated (step S107). If there is another plane for the target plane, the processing of the step S102 and the subsequent steps is repeated. On the other hand, if there is no plane for the target plane, the processing is finished (step S108). Thus, a range image, as exemplified in FIG. 6, is formed with respect to all planes that are limited according to the evaluation of the similarity evaluating unit 103 in FIG. 1. For example, when the pair of the planes 401 and 405, the pair of the planes 401 and 406, the pair of the planes 403 and 407, and the pair of the planes 403 and 408 are estimated to have high similarity, the following range images are formed. That is, a range image including the plane 401 as a target plane, a range image including the plane 403 as a target plane, a range image including the plane 405 as a target plane, a range image including the plane 406 as a target plane, a range image including the plane 407 as a target plane, and a range image including the plane 408 as a target plane are formed.

The above-described processing is performed by the distance correlation data calculating unit 104 in FIG. 1. Next, the function of the matching plane identifying unit 105 will be described. The matching plane identifying unit 105 determines matching planes between the planes 401, 402, 403, and 404 of the first viewpoint in FIG. 3A and the planes 405, 406, 407, and 408 of the second viewpoint in FIG. 3B, based on the range images that are obtained by the distance correlation data calculating unit 104. The matching plane identifying unit 105 compares one of the range images for the first viewpoint and one of the range images for the second viewpoint and identifies a pair of planes having the least difference as matching planes between the two viewpoints. That is, plural range images obtained at the viewpoint in FIG. 3A and plural range images obtained at the viewpoint in FIG. 3B are individually compared to find a pair of range images that are most similar, and target planes in the pair of the range images are identified as matching planes.

Figure 7:
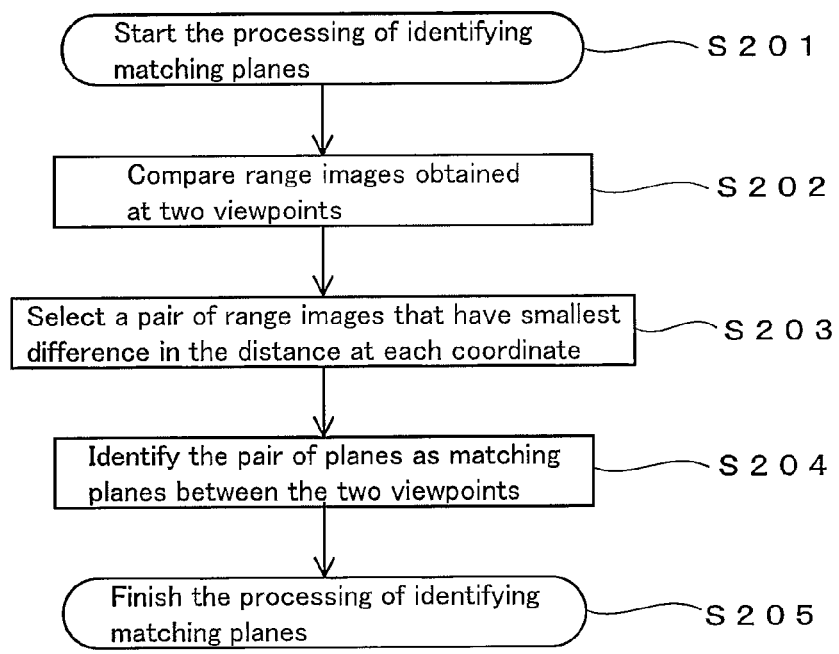
FIG. 7 is a flow chart showing an example of procedures in an embodiment.

FIG. 7 is a flow chart showing an example of the processing performed by the matching plane identifying unit 105. When the processing is started (step S201), two range images are compared while the centers of gravity thereof are set at the same position (step S202). In this case, the values of distances at the same coordinate points (grid points) are compared, and an average of the differences is calculated as a value of RMS. If there is no value of the distance at a grid point for at least one of the two range images, the difference at the grid point is not calculated. The value of RMS is calculated by the following Third Formula.

$$\text{RMS} = \sqrt{\frac{\Sigma |P_1 - Q_1|}{N}} \qquad \text{Third Formula}$$

Figure 8:
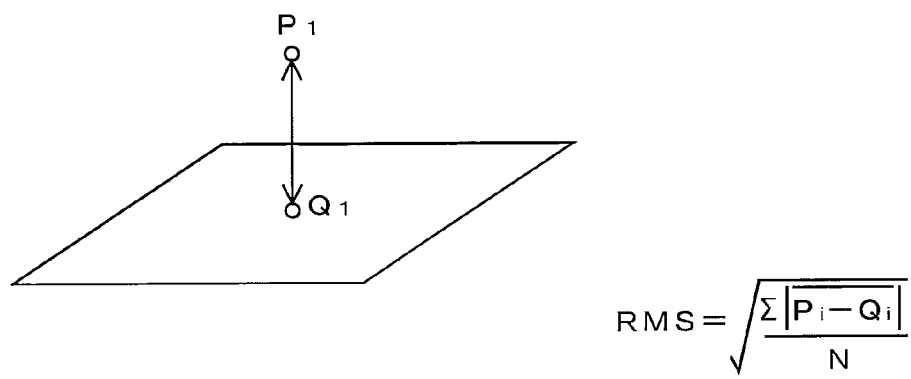
FIG. 8 is a conceptual diagram for describing a concept for measuring similarity between range images.

FIG. 8 is a conceptual diagram for describing the symbols $P_i$ and $Q_i$ in the Third Formula in the form of a point $P_1$ and a point $Q_1$, respectively. The point $Q_1$ is located at a position corresponding to the value of the distance at a particular grid point of a first range image. The point $P_1$ is located at a position corresponding to the value of the distance at the particular grid point of a second range image. Then, the value of RMS is calculated by the Third Formula when the number of the grid points is "N". When the similarity of the range images is higher, the value of RMS is smaller, whereas when the similarity of the range images is lower, the value of RMS is greater. If the range images are the same image, the value of RMS is 0 in theory. However, there may be cases in which the value of RMS is not 0 even though the range images are the same image due to errors and the like in practice. The value of RMS is calculated with respect to each possible pair of the planes. The results of calculating the values of RMS are exemplified in the following Table 4. As shown in Table 4, the value of RMS is small for the range images that have target planes which correspond with each other when viewed from two viewpoints, and the value of RMS is large for the range images that have target planes which do not correspond with each other when viewed from the two viewpoints.

TABLE 4

| First viewpoint | Second viewpoint | RMS |
|---|---|---|
| Plane 401 | Plane 405 | 0.348 |
| Plane 401 | Plane 406 | 2.219 |
| Plane 403 | Plane 407 | 1.123 |

Then, a pair of the range images that have the smallest value of RMS is selected (step S203). In this example, the pair of the range images that have the plane 401 or 405 as the target plane have the smallest value of RMS and are thereby selected as a pair having matching planes. The pair of the target planes that have the smallest value of RMS is identified as matching planes (step S204), and then the processing of the matching plane identifying unit 105 is completed (step S205).

When the value of RMS is small, the similarity between the compared two range images is high. The high similarity between the two range images represents high similarity in the distance correlation data group between the associated two target planes with respect to the other planes. That is, the specific positional correlations of the two target planes with respect to the other planes are similar. As noted above, the correlation data group shows the positional relationship between a target plane and each of the other planes of the object in a three-dimensional space and thereby can be used as a function for identifying the target plane. Thus, by comparing the correlation data group selected from the planes of the first viewpoint and the correlation data group selected from the planes of the second viewpoint to find a pair having the smallest difference therebetween, matching planes between the two viewpoints, as exemplified by the planes 401 and 405, are determined.

Figure 9:
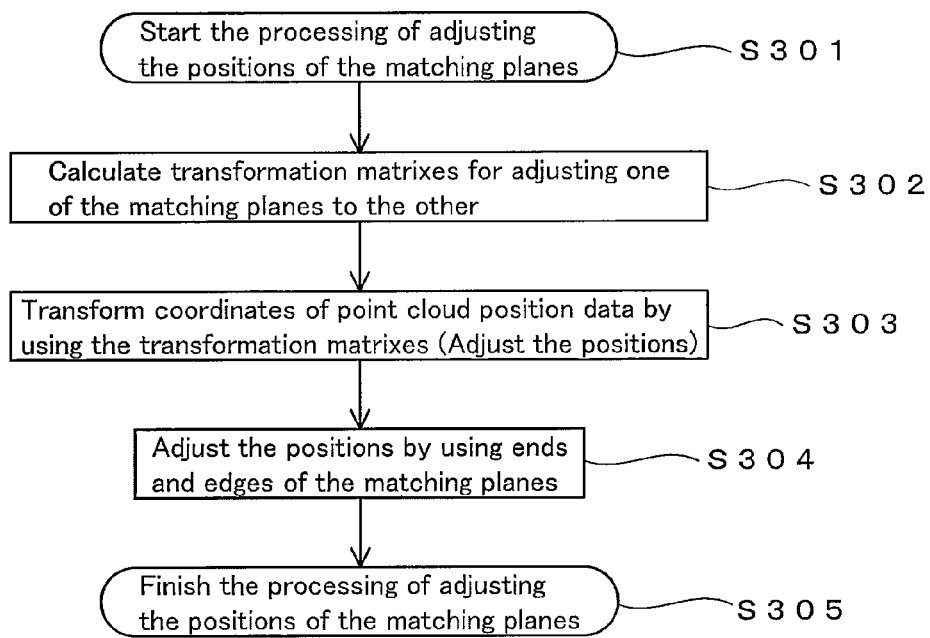
FIG. 9 is a flow chart showing an example of procedures in an embodiment.

The matching plane positioning unit 106 in FIG. 1 adjusts positions of the matching planes, which are identified by the matching plane identifying unit 105. FIG. 9 is a flow chart showing an example of the processing performed by the matching plane positioning unit 106. When the processing is started (step S301), transformation matrixes that are necessary to adjust one matching plane to the other matching plane are calculated (step S302). For example, in the case shown in FIGS. 3A and 3B, transformation matrixes are calculated so as to perform rigid-body transformation by adjusting the positions of the centers of gravity of the planes 401 and 405 and aligning the normal directions of the two planes. For example, in order to adjust the plane 405 to the plane 401, the transformation is represented by the following Fourth Formula. Here, $T_c$ is a transformation matrix that represents parallel translation of the plane 405, $R_c$ is a transformation matrix to rotate the plane 405, $P_2$ is second three-dimensional point cloud position data before the transformation, and $P_2'$ is second three-dimensional point cloud position data after the transformation.

$$P_2'=(R_c \times P_2)+T_c \qquad \text{Fourth Formula}$$

By performing this rigid-body transformation with respect to the entirety of the second three-dimensional point cloud position data, the positions of the first three-dimensional point cloud position data and the second three-dimensional point cloud position data are approximately adjusted (step S303). This position adjustment clarifies the correspondence relationship between the first three-dimensional point cloud position data and the second three-dimensional point cloud position data and enables to use the two sets of three-dimensional point cloud position data in the same coordinate system.

In principle, according to the above-described method, the positions of the three-dimensional point cloud position data that are obtained at two different viewpoints are adjusted, that is, the correspondence relationship between the first three-dimensional point cloud position data and the second three-dimensional point cloud position data is obtained. However, there may be cases in which a slight difference occurs between the positions of the centers of gravity or the like due to the effects of noise and measurement errors.

In view of this, in order to further increase the accuracy of the position adjustment, a correction value for correcting the transformation matrix in the Fourth Formula is calculated so that the contours (end potions) and the edges (corner portions) of the selected matching planes (for example, the planes 401 and 405 in FIGS. 3A and 3B) correspond with each other. Since the positions are approximately adjusted, this calculation need not be performed with respect to enormous amount of the three-dimensional point cloud position data and can be performed for a short time. Since the positions of the contours and the edges of the planes 401 and 405 are parameters that characterize the planes 401 and 405, the positions of the matching planes are adjusted at further high accuracy by finely adjusting these positions. This processing may be performed by the matching plane identifying unit 105 or by the matching plane positioning unit 106.

Next, the fine positioning unit 107 will be described. In the position adjustment performed by the matching plane positioning unit 106, the positions are adjusted based on one plane, whereby it is often the case that certain degrees of errors occur. In regard to this, the fine positioning unit 107 performs a further detailed position adjustment based on the results of the processing in the matching plane positioning unit 106, thereby increasing the accuracy of the position adjustment.

The processing that is performed by the fine positioning unit 107 will be described in detail hereinafter. In this processing, the information of the planes, in which the coordinates are transformed by the Fourth Formula, is used to relate the planes to each other, except for the matching planes that are already identified. That is, in the example shown in FIGS. 3A and 3B, the planes other than the planes 401 and 405, which are already matched at this stage, are related to each other. In the relating processing, first, whether two target planes are on the same plane or not is determined by using a coplanar condition.

Figure 10:
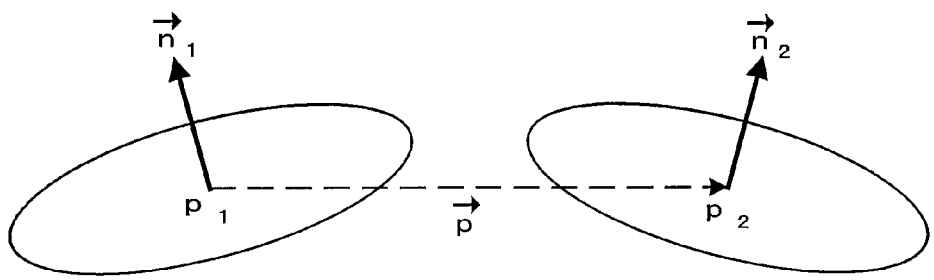
FIG. 10 is a conceptual diagram for describing a concept in a processing for adjusting positions.

FIG. 10 is a conceptual diagram for describing the coplanar condition. The normal vectors of two target planes are represented by $n_1$ and $n_2$, points on the two target planes are represented by $p_1$ and $p_2$, and the vector connecting the two points is represented by p. One of the two target planes is based on the first three-dimensional point cloud position data, and the other is based on the second three-dimensional point cloud position data. By using the following Fifth Formula for determining the coplanarity, whether the two target planes are on the same plane or not is determined.

$$d = \max(|\vec{p} \cdot \vec{n}_1|, |\vec{p} \cdot \vec{n}_2|) \quad \text{Fifth Formula}$$

In this case, when the value of "d" is less than 1, the two target planes are determined to be on the same plane. If the two target planes are determined to be on the same plane, whether the two target planes overlap each other or not is then determined. In this case, when the two target planes overlap with each other by not less than 75%, the two target planes are identified as matching planes between the two viewpoints. Whether target planes are on the same plane and whether the target planes overlap with each other when they are on the same plane, are determined with respect to all of the planes. However, since the approximate positional relationship is already determined, target planes to be determined can be limited, and the amount of calculation therefor is markedly decreased compared with a case of calculating all possible pairs.

Figure 11:
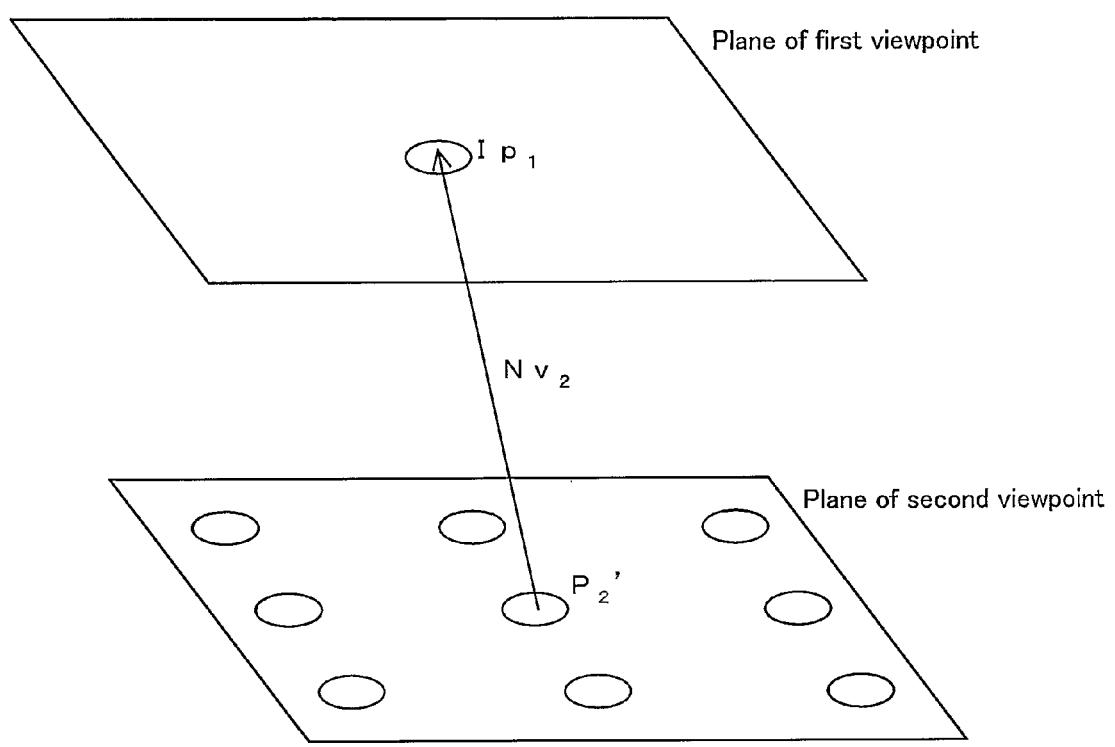
FIG. 11 is a conceptual diagram for describing a concept in a processing for adjusting positions.

Next, all of the pairs of the planes that are identified as matching planes are extracted. Then, by using the matching plane of the first viewpoint and the point in the corresponding matching plane of the second viewpoint, a distance "d" between the plane and the point is calculated as shown in FIG. 11. The distance "d" is represented by the following Sixth Formula. Here, $P_2'$ is a point contained in the matching plane of the second viewpoint (rigid-body transformation is already performed by the Fourth Formula), and $Nv_2$ is a normal line of the matching plane of the second viewpoint. In addition, $Ip_1$ is a point at the intersection of the vector from the point $P_2'$ in the direction of the normal line $Nv_2$ with the matching plane of the first viewpoint.

$$d = \sqrt{(Ip_1 - P_2')^2} \quad \text{Sixth Formula}$$

Although FIG. 11 shows a distance from one point on the matching plane of the second viewpoint, the calculation is performed with respect to all points on the matching plane of the second viewpoint, and the total thereof is used as an error. The error is then minimized. In this case, the error is minimized by the multidimensional downhill simplex method. First, an error evaluation function E (Seventh Formula) representing the total of the distances is introduced.

$$E = \sum_{l=1}^{N} \{lp_1^l - (Rd \cdot P_2^{l'} + T_d)\}^2 \quad \text{Seventh Formula}$$

In order to minimize the value of E, rigid-body transformation parameters $R_d$ and $T_d$ are calculated. In this case, coefficients of reflection, magnification, and contraction for calculating the simplex are set to be 1.0, 0.5, and 2.0, respectively. Convergence is determined by the following Eighth Formula.

$$e > \frac{2|f(T_h, R_h) - f(T_1, R_1)|}{|f(T_h, R_h)| + |f(T_1, R_1)|} \quad \text{Eighth Formula}$$

The Eighth Formula is calculated by using parameters $T_h$ and $R_h$, parameters $T_1$ and $R_1$, and a function "f" that is used for calculating errors by using these parameters. The parameters $T_h$ and $R_h$ have the maximum errors and the parameters $T_1$ and $R_1$ have the minimum errors, and they are obtained from the transformation parameters that are obtained during repeated calculation. The repeated calculation is determined to be convergent and is finished when the condition of the Eighth Formula is satisfied. In this case, the convergence condition is $e=1.0^{-12}$. Otherwise, the upper limit of the number of repeating the calculation is set to be 5000 times even when the calculation does not converge.

Thus, correspondence relationships are calculated between the planes other than the matching planes that are identified by the matching plane identifying unit 105, whereby the positions of the three-dimensional point cloud position data obtained at the two different viewpoints are more finely adjusted. The above-described processing is performed by the fine positioning unit 107.

The position adjustment in the fine positioning unit 107 may also be performed by using a publicly known ICP (Iterative Closest Point) algorithm instead of the above-described method. In this case, since the positions are approximately adjusted by the matching plane positioning unit 106, it is not necessary to select comparing points, search matching points, and remove unnecessary points in the ICP algorithm. Accordingly, only the calculation for error minimization is required, whereby the calculation is performed at high accuracy for a small amount of calculation. The errors can also be minimized by using the steepest descent method or the Newton's method instead of the downhill simplex. When the ICP algorithm is used, the matching planes are compared with the corresponding matching planes and are related to the corresponding matching planes by repeated calculation.

The coordinate integrating unit 108 in FIG. 1 integrates a first coordinate system and a second coordinate system, based on the rigid-body transformation parameters that are obtained by the matching plane positioning unit 106 and the fine positioning unit 107. The first coordinate system is used for describing the first three-dimensional point cloud position data. The second coordinate system is used for describing the second three-dimensional point cloud position data. The integration is performed by, for example, transforming one of the coordinate systems to the other. Thus, the two sets of the three-dimensional point cloud position data can be used by the same coordinate system. Accordingly, for example, the three-dimensional point cloud position data obtained at the first viewpoint in FIG. 3A and the three-dimensional point cloud position data obtained at the second viewpoint in FIG. 3B can be integrally used.

The integrated three-dimensional model-constructing unit 109 constructs a three-dimensional model based on the three-dimensional point cloud position data that are obtained at the two different viewpoints. In this constructed three-dimensional model, portions that cannot be viewed from one viewpoint are complemented by the three-dimensional point cloud position data obtained at another viewpoint. The integrated image constructing unit 110 generates image data of the three-dimensional model that is constructed by the integrated three-dimensional model-constructing unit 109. The image data can be sent to a display unit such as a liquid crystal display or the like, and be displayed, whereby an image of a three-dimensional model, for example, as shown in FIGS. 3A and 3B, is displayed.

For example, a three-dimensional model is obtained by integrally using the three-dimensional point cloud position data obtained at the first viewpoint in FIG. 3A and the three-dimensional point cloud position data obtained at the second viewpoint in FIG. 3B. When this three-dimensional model is rotated so as to be viewed from the first viewpoint, it has an appearance as shown in FIG. 3A. On the other hand, when this three-dimensional model is rotated so as to be viewed from the second viewpoint, it has an appearance as shown in FIG. 3B. In this three-dimensional model, although the plane 406 cannot be viewed from the first viewpoint and the plane 402 cannot be viewed from the second viewpoint, they can be displayed by rotating.

Thus, an image data, in which occlusion does not occur at particular portions in a rotated three-dimensional model, is obtained as long as they can be viewed from at least one of the viewpoints in FIGS. 3A and 3B. Accordingly, the image data can be displayed by rotating as in the case of three-dimensional CAD data.

Example of Operation

Figure 12:
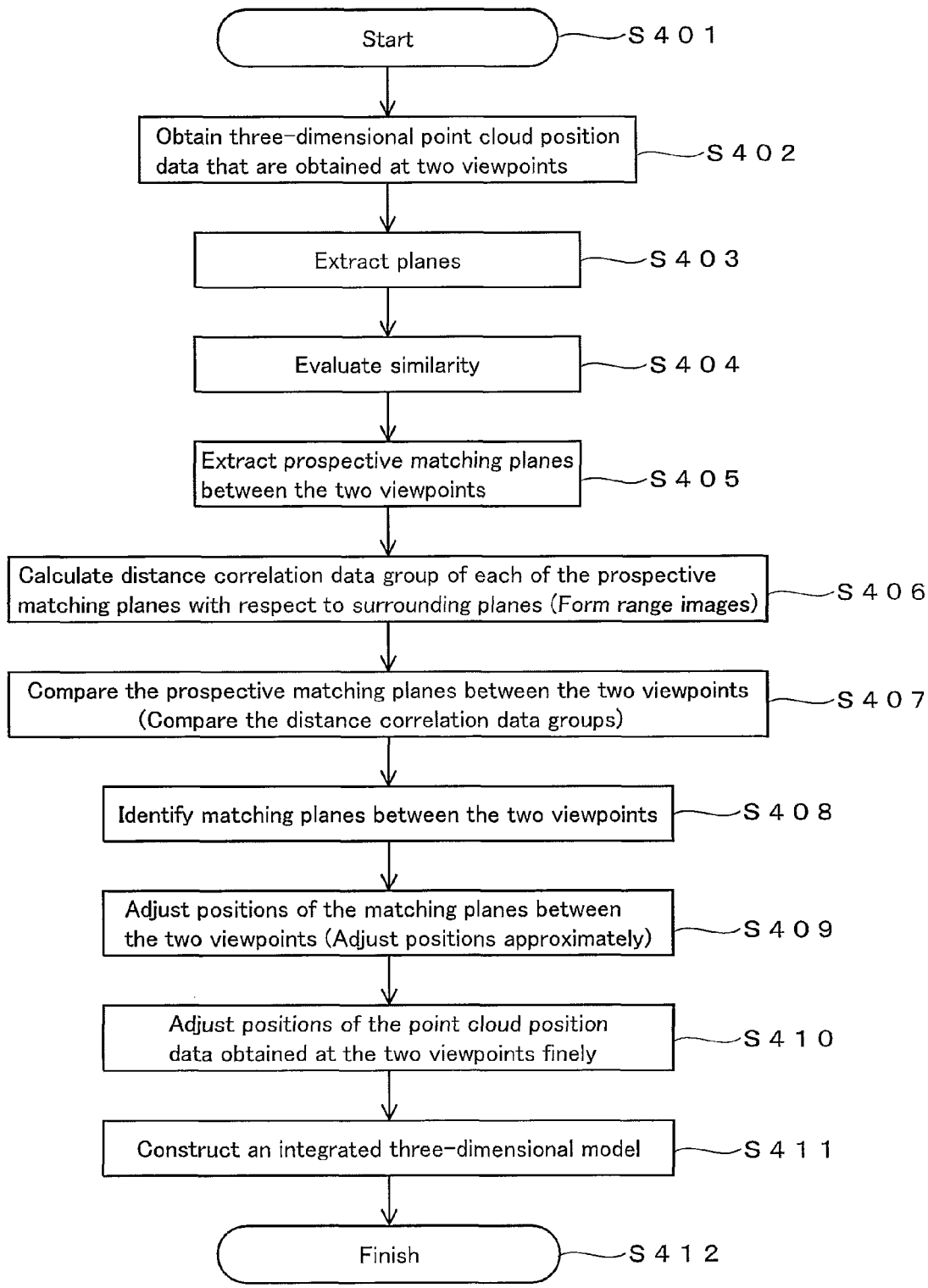
FIG. 12 is a flow chart showing an example of procedures in an embodiment.

An example of operation of the device 100 in FIG. 1 will be described hereinafter. FIG. 12 is a flow chart showing an example of operation of the device 100. When the processing is started (step S401), first, the three-dimensional point cloud position data obtaining unit 101 in FIG. 1 obtains three-dimensional point cloud position data that are obtained at two different viewpoints (step S402). Then, the three-dimensional model-constructing unit 102 in FIG. 1 performs the processing based on the three-dimensional point cloud position data, whereby planes are labeled, and planes of an object are extracted. This processing is performed with respect to each of the two sets of three-dimensional point cloud position data that are obtained at the two viewpoints (step S403).

Next, similarity is evaluated based on the data of the extracted planes (step S404), and pairs of planes having high similarity are thereby extracted as prospective matching planes (step S405). This processing is performed by the similarity evaluating unit 103 in FIG. 1. Then, distance correlation data of the prospective matching planes with respect to the other planes are calculated, whereby range images are formed (step S406). This processing is performed by the distance correlation data calculating unit 104 in FIG. 1 according to, for example, the steps shown in FIG. 4.

Then, the range images formed in the step S406 are compared (step S407), and a pair of the prospective matching planes having a minimum value of RMS is identified as matching planes between the planes obtained at the two different viewpoints (step S408). The value of RMS is based on the difference of the distance data at each coordinate. This processing is performed by the matching plane identifying unit 105 in FIG. 1 according to, for example, the steps shown in FIG. 7.

After the matching planes are identified, positions thereof are adjusted, and correspondence relationship between the coordinates of one of the matching planes and the coordinates of the other is calculated (step S409). This processing is performed by the matching plane positioning unit 106 in FIG. 1 according to, for example, the steps shown in FIG. 9.

After the step S409 is performed, positions of the remaining pairs of the prospective matching planes are adjusted, whereby the positions are more finely adjusted (step S410). This processing is performed by the fine positioning unit 107 in FIG. 1 according to, for example, the steps that are described in relation to FIGS. 10 and 11.

After the positions are finely adjusted in the step S410, correspondence relationship between the three-dimensional point cloud position data obtained at the two different viewpoints is calculated, and a coordinate system is obtained to integrally use the two sets of three-dimensional point cloud position data. Then, an integrated three-dimensional model is constructed by using the coordinate system (step S411), and the processing is finished (step S412).

Advantages

As a parameter for characterizing the plane 401 that is included in plural planes forming the object, the projecting plane 500 having the same normal vector as the plane 401 is set in a measurement space. Then, the plane 401 and the other planes are projected on the projecting plane 500. In this case, a distance between each of the planes and the projecting plane 500 is calculated at each grid point set on the projecting plane 500, whereby matrix data is obtained as a range image that characterizes the plane 401. The range image is also formed with respect to each of the other planes and with respect to each of the planes that are viewed from the different viewpoint. Then, the range images of the two viewpoints are compared, and a pair of planes having the smallest difference between the range images thereof is identified as matching planes between the two viewpoints.

According to this method, by comparing the correlation data group characterizing a target plane of the first viewpoint with that of a target plane of the second viewpoint, target planes that have the same characteristics are identified as matching planes. The correlation data group as exemplified in Table 3 is specific for the target plane and is a particular feature that characterizes the target plane. Thus, by searching for a pair of the correlation data groups that have the smallest difference therebetween, matching planes are determined at very high accuracy.

Moreover, since the correspondence relationships between the other planes are calculated after the matching planes are identified, the positions are adjusted at higher accuracy. In this case, since the positions are approximately adjusted right after the matching planes are identified, the number of the planes to be calculated is limited, thereby decreasing unnecessary processing such as calculations of the relationships between data for which the positions do not correspond with each other. Thus, the processing time is decreased while high accuracy is obtained.

In addition, the prospective matching planes are limited by using the similarities of the area and the shape, and then matching planes are identified by using the range images. Thus, the amount of calculation is decreased, and the calculation is performed at high accuracy.

Other Matters

In order to obtain the correlation data group that shows the positional relationship in the three-dimensional space between the target plane and the other planes of the object, another method may be used instead of the method exemplified in FIG. 5. For example, a distance between the center of gravity of the target plane and each position in the other plane may be calculated and be obtained as matrix data as in the case of the range image in FIG. 6 so as to characterize the target plane. In another case, a distance between an end of the target plane and an end of the other plane may be calculated so as to obtain a data group corresponding to a range image. Similarly, in these methods, the three-dimensional positional relationship between the target plane and each of the other planes is quantitatively determined, whereby the target plane is characterized and can be differentiated from the other planes on the object.

Although a case for two viewpoints is described as a basic example in this embodiment, the information thereof may be further integrated with information that is obtained from another viewpoint such as a third viewpoint, a fourth viewpoint, and so on. In this case, generation of occlusion is further decreased, and a three-dimensional model is obtained at higher accuracy. In some cases, data can also be extracted from a stereoscopic photographic image and be used as three-dimensional point cloud position data that is obtained at one of plural viewpoints. For example, when main three-dimensional point cloud position data is obtained by a laser scanner, there may be cases in which a part of the three-dimensional point cloud position data needs to be complemented. In this example, three-dimensional point cloud position data may be preferably obtained by using a photographed stereoscopic image rather than a laser scanner in view of working efficiency in some cases. In such cases, matching planes are calculated based on the three-dimensional point cloud position data obtained by the laser scanner and the three-dimensional point cloud position data obtained from the stereoscopic photographic image.

2. Second Embodiment

For a method for determining matching planes by using a relative position between a target plane and the other plane, the most suitable method is using a correlation data group showing a positional relationship in a three-dimensional space between a target plane and each of the other planes of an object, which is described in the First Embodiment. However, alternatively, another method may also be used. Another example of the method for determining matching planes by using a relative position between a target plane and the other plane will be described hereinafter. In this example, in order to determine matching planes, parameters relating to the three-dimensional shape of an object are compared, and similarity therebetween is evaluated.

The three-dimensional model-constructing unit 102 in FIG. 1 performs processing based on the three-dimensional point cloud position data, whereby the appearance of the object can be understood from a set of plural planes. Each of the planes is used as a label that can be differentiated from each other. The label includes data of position and direction of its associated plane. The position of the label is identified by, for example, the three-dimensional coordinates of the center of gravity of its associated plane.

Figure 13A:
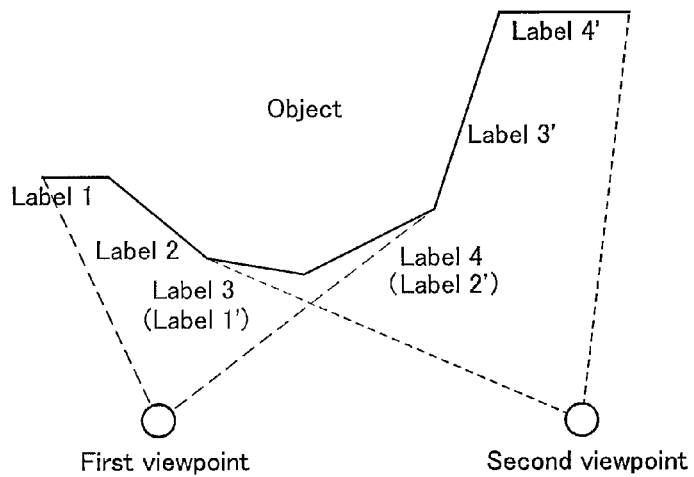
FIGS. 13A to 13D are conceptual diagrams for describing a function of a method for calculating matching planes by using angular information of planes.

By comparing the distributions (or combined shapes) of the labels and searching a positional relationship with the smallest difference therebetween, matching planes are identified. FIGS. 13A to 13D are conceptual diagrams for describing a method for matching planes by using labels. FIG. 13A shows a conceptually simplified model that describes a condition in which three-dimensional point cloud position data is obtained at a first viewpoint and is also obtained at a second viewpoint with respect to an object.

In this case, the object is formed of a plane 1 with a label 1, a plane 2 with a label 2, a plane 3 with a label 3 (label 1'), a plane 4 with a label 4 (label 2'), a plane 5 with a label 3', and a plane 6 with a label 4'.

Figure 13B:

The labels 3' and 4' are occluded when viewed from the first viewpoint, and three-dimensional point cloud position data thereof are thereby not obtained at the first viewpoint. FIG. 13B shows a labeled model of the object (model formed of labels for the object), which is obtained at the first viewpoint. The labeled model of the object is essentially a three-dimensional model, but in this case, a two-dimensional simplified model is shown.

Figure 13C:
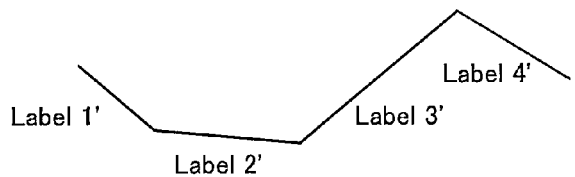

The labels 1 and 2 are occluded when viewed from the second viewpoint, and three-dimensional point cloud position data thereof are thereby not obtained at the second viewpoint. FIG. 13C shows a labeled model of the object, which is obtained at the second viewpoint.

The correspondence relationship between the labeled model in FIG. 13B and the labeled model in FIG. 13C is not clear before the positions of the three-dimensional point cloud position data obtained at the two viewpoints are adjusted, that is, before the correspondence relationship is determined. Hereinafter, a method for clarifying the correspondence relationship between the labeled model in FIG. 13B and the labeled model in FIG. 13C will be described. In this method, the correlations of adjacent labels are compared between the two labeled models, and the positions of the two labeled models are adjusted based on the similarity therebetween.

The label is characterized by information of the direction and the position of the center of gravity of its associated plane. Thus, in the case shown in FIG. 13A, each of the correlation between the labels 1 and 2, the correlation between the labels 2 and 3, and the correlation between the labels 3 and 4 is clarified by estimating a relationship of the relative position and the direction between adjacent labels. Then, the correlation between the adjacent labels identifies the shape of the labeled model shown in FIG. 13B. Similarly, another correlation between adjacent labels identifies the shape of the labeled model shown in FIG. 13C.

A specific example of the processing will be described as follows. FIG. 14 shows examples of histograms, each of which is based on a particular label. The histogram has a horizontal axis for the angle of the other label with respect to the particular label and has a vertical axis for the number of points of the three-dimensional point clouds that form the other label at each angle. The vertical axis of the histogram can be understood as a parameter that corresponds to the area of the plane. In this example, histograms are formed based on each label shown in FIG. 13B, which is obtained at the first viewpoint, and are also formed based on each label shown in FIG. 13C, which is obtained at the second viewpoint. These histograms show the correlations between the adjacent labels.

Figure 13D:
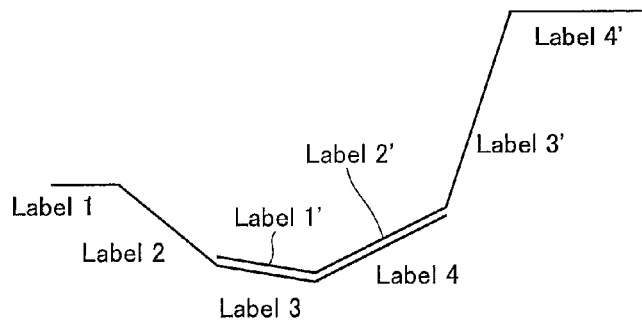

In this example, the particular labels having a very similar histogram that is shown in FIG. 14 are selected as corresponding planes. For example, FIG. 14 shows histograms among which a histogram based on the label 3 obtained at the first viewpoint is similar to a histogram based on the label 1' obtained at the second viewpoint. Therefore, in this case, the label 3 in FIG. 13B and the label 1' in FIG. 13C are selected as corresponding planes. Then, by further comparing such histograms, although they are not shown in FIG. 14, the label 4 in FIG. 13B and the label 2' in FIG. 13C are selected as corresponding planes. Thus, the correspondence relationship between the labels obtained at the first viewpoint and the labels obtained at the second viewpoint is obtained as shown in FIG. 13D. By obtaining these corresponding planes, matching planes between three-dimensional models obtained at the two different viewpoints are identified as in the case of identifying the matching planes by using the range images, which is described with reference to FIGS. 5 to 7.

When the above-described processing is performed by the device 100 in FIG. 1, the distance correlation data calculating unit 104 is replaced with a processing unit that can form the histograms. In this case, the device 100 is configured so that the matching plane identifying unit 105 selects similar histograms and identifies matching planes.

The amount of the data of the information relating to the labels can be much smaller than that of the three-dimensional point cloud position data. Thus, the calculation based on the function shown in FIGS. 13A to 13D is performed much more rapidly compared with the case of matching planes by using the original three-dimensional point cloud position data.

The positions can also be adjusted by a method other than the method of using the histograms. For example, a case of adjusting the positions of the two labeled models shown in FIGS. 13B and 13C will be described. In this case, corresponding planes are identified by searching portions with corresponding shapes by a method such as a stereo matching method or the like. For example, one or both of the labeled models in FIGS. 13B and 13C are moved, and they are then changed in magnification as necessary, so that the portions of the labels 3 and 4 and the portions of the labels 1' and 2', which have a common correlation, coincide (see FIG. 13D). Thus, corresponding planes between the two labeled models are determined.

The above-described method of determining the corresponding planes by using the directional relationship between the labels can also be effectively used in combination with the method of using the range images, which is described in the First Embodiment. For example, prospective matching planes may be limited by the method in this embodiment, and then matching planes may be identified by the method in the First Embodiment. On the other hand, matching planes may be identified by the method in the First Embodiment, and then the method in this Embodiment may be applied to plural planes including the matching planes. Otherwise, the method in the First Embodiment or the method in this Embodiment may be appropriately selected according to the shape of an object, and then matching planes may be identified.

3. Third Embodiment

A three-dimensional laser scanner that can process three-dimensional point cloud position data will be described hereinafter. In this example, the three-dimensional laser scanner emits distance measuring light (laser light) and scans with respect to an object and measures a distance to each target point on the object therefrom based on flight time of the laser light. Then, the three-dimensional laser scanner measures the emitted direction (horizontal angle and elevation angle) of the laser light and calculates three-dimensional coordinates of the target point based on the distance and the emitted direction. The three-dimensional laser scanner takes two-dimensional images (RGB intensity of each of the target points) that are photographs of the object and then forms three-dimensional point cloud position data by linking the two-dimensional images and the three-dimensional coordinates. Moreover, this three-dimensional laser scanner performs the processing that is performed by the device 100 and that is described in relation to FIG. 1.

Structure

Figure 15:
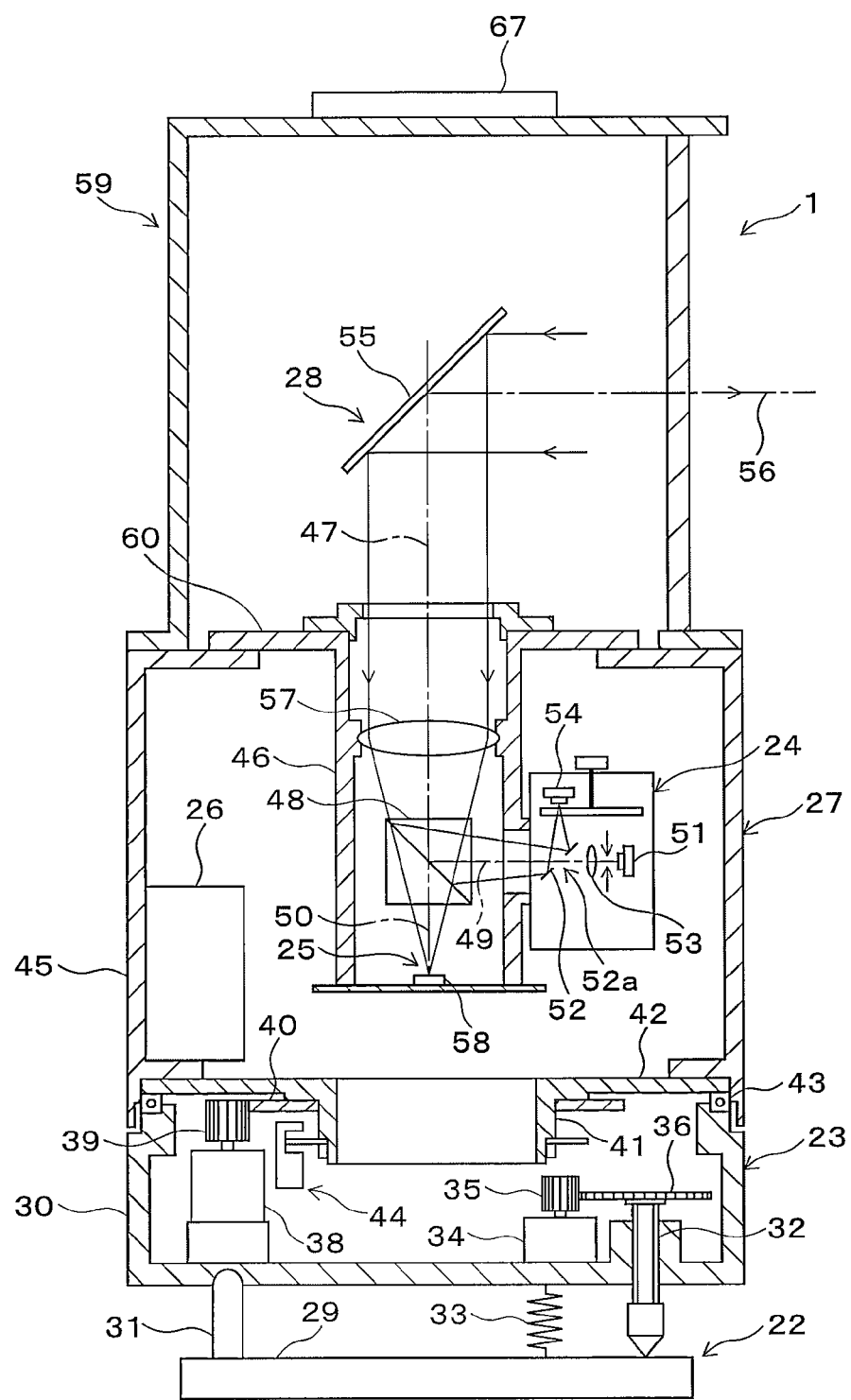
FIG. 15 is an internal structural drawing showing an example of an internal structure of a laser scanner.
Figure 16:
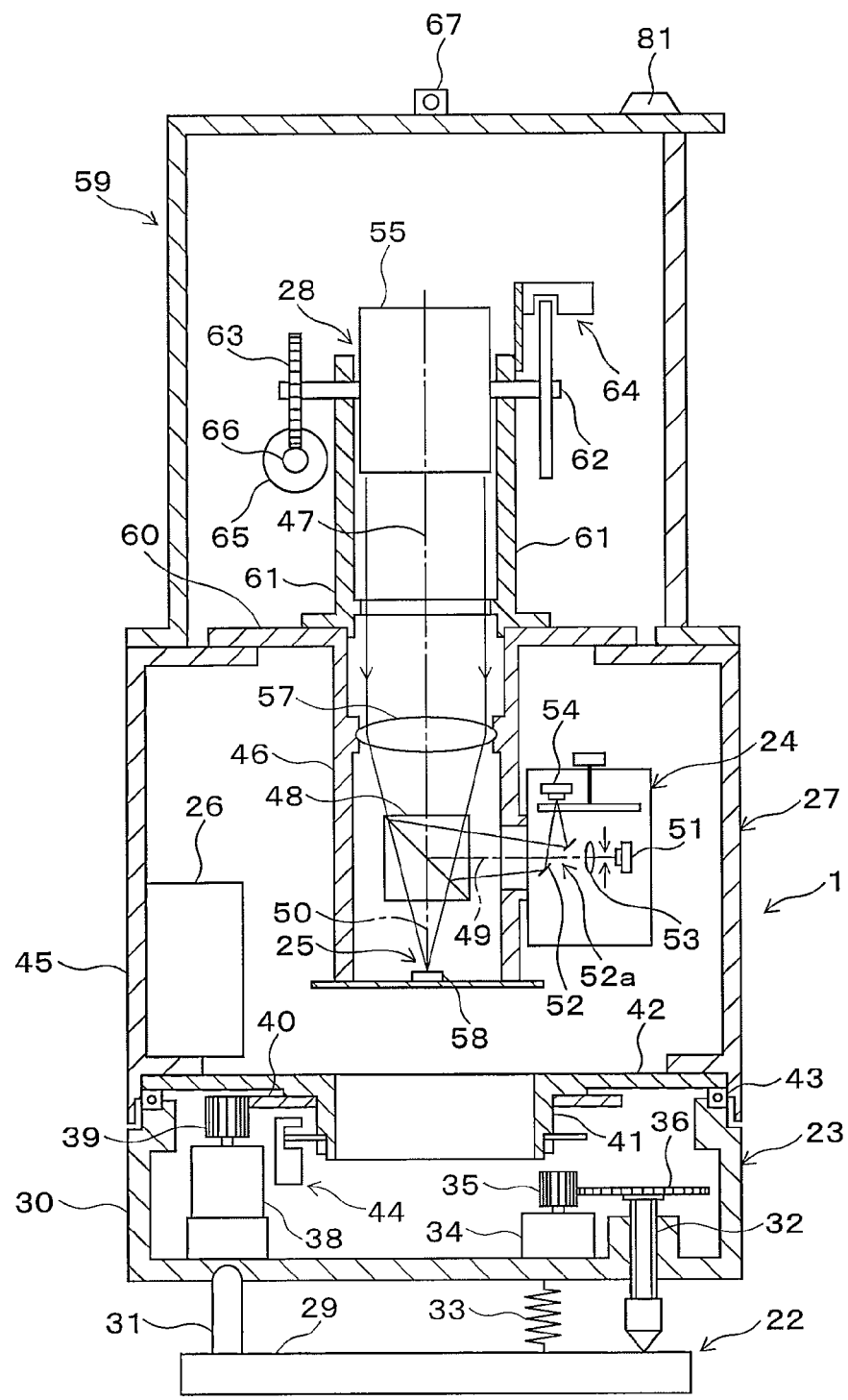
FIG. 16 is an internal structural drawing showing an example of an internal structure of the laser scanner.

FIGS. 15 and 16 are cross sections showing a structure of a three-dimensional laser scanner 1 equipped with a level unit 22, a rotational mechanism 23, a main body 27, and a rotationally emitting unit 28. The main body 27 is formed of a distance measuring unit 24, an imaging unit 25, and a controlling unit 26, etc. For convenience of description, FIG. 15 shows the three-dimensional laser scanner 1 in which only the rotationally emitting unit 28 is viewed from a side direction with respect to the cross-section direction shown in FIG. 16.

The level unit 22 has a base plate 29, and the rotational mechanism 23 has a lower casing 30. The lower casing 30 is supported by the base plate 29 with three points of a pin 31 and two adjusting screws 32. The lower casing 30 is tiltable on a fulcrum of a head of the pin 31. The base plate 29 and the lower casing 30 are provided with an extension spring 33 therebetween so that they are not separated from each other.

The lower casing 30 includes two level motors 34 that are provided therein. The two level motors 34 are driven independently of each other by the controlling unit 26. By driving the level motors 34, the adjusting screws 32 rotate via a level driving gear 35 and a level driven gear 36, and the downwardly protruded amounts of the adjusting screws 32 are adjusted. Moreover, the lower casing 30 includes a tilt sensor 37 (see FIG. 17) that is provided therein. The two level motors 34 are driven by detection signals of the tilt sensor 37, whereby leveling is performed.

The rotational mechanism 23 has a horizontal rotation driving motor 38 inside the lower casing 30. The horizontal rotation driving motor 38 has an output shaft into which a horizontal rotation driving gear 39 is fitted. The horizontal rotation driving gear 39 is engaged with a horizontal rotation gear 40. The horizontal rotation gear 40 is provided to a rotating shaft portion 41. The rotating shaft portion 41 is provided at the center portion of a rotating base 42. The rotating base 42 is provided on the lower casing 30 via a bearing 43.

The rotating shaft portion 41 is provided with a horizontal angle sensor 44 in the form of, for example, a rotary encoder. The horizontal angle sensor 44 measures a relative rotational angle (horizontal angle) of the rotating shaft portion 41 with respect to the lower casing 30. The measured horizontal angle is input to the controlling unit 26, and the controlling unit 26 correspondingly controls the horizontal rotation driving motor 38.

The main body 27 has a main body casing 45. The main body casing 45 is securely fixed to the rotating base 42. The main body casing 45 includes a lens tube 46 that is provided therein. The lens tube 46 has a rotation center that is concentric with the rotation center of the main body casing 45. The rotation center of the lens tube 46 corresponds to an optical axis 47. The lens tube 46 includes a beam splitter 48 that is provided therein as a means for splitting light flux. The beam splitter 48 transmits visible light and reflects infrared light. The optical axis 47 is split into an optical axis 49 and an optical axis 50 by the beam splitter 48.

The distance measuring unit 24 is provided to the outer peripheral portion of the lens tube 46. The distance measuring unit 24 has a pulse laser light source 51 as a light emitting portion. The pulse laser light source 51 and the beam splitter 48 are provided with a perforated mirror 52 and a beam waist-changing optical system 53 therebetween. The beam waist-changing optical system 53 changes the beam waist diameter of the laser light. The pulse laser light source 51, the beam waist-changing optical system 53, and the perforated mirror 52, form a distance measuring light source unit. The perforated mirror 52 introduces the pulse laser light from a hole 52a to the beam splitter 48 and reflects laser light, which is reflected at the object and returns, to a distance measuring-light receiver 54.

The pulse laser light source 51 is controlled by the controlling unit 26 and emits infrared pulse laser light at a predetermined timing accordingly. The infrared pulse laser light is reflected to an elevation adjusting rotating mirror 55 by the beam splitter 48. The elevation adjusting rotating mirror 55 reflects the infrared pulse laser light to the object. The elevation adjusting rotating mirror 55 turns in the elevation direction and thereby converts the vertically-extending optical axis 47 into a floodlight axis 56 in the elevation direction. The lens tube 46 includes a focusing lens 57 that is provided therein between the beam splitter 48 and the elevation adjusting rotating mirror 55.

The laser light reflected at the object is guided to the distance measuring-light receiver 54 via the elevation adjusting rotating mirror 55, the focusing lens 57, the beam splitter 48, and the perforated mirror 52. In addition, reference light is also guided to the distance measuring-light receiver 54 through an inner reference light path. Based on a difference between two times, a distance from the three-dimensional laser scanner 1 to the object (target point) is measured. One of the two times is the time until the laser light is reflected and is received at the distance measuring-light receiver 54, and the other is the time until the laser light is received at the distance measuring-light receiver 54 through the inner reference light path. The distance measuring-light receiver 54 is formed of a photoelectric change element such as a CMOS optical sensor, etc., and it can also measure RGB intensity of detected light.

The imaging unit 25 has an image sensor 58 that functions as a camera. The image sensor 58 is provided at the bottom of the lens tube 46. The image sensor 58 is formed of a device in which numerous pixels are flatly assembled and arrayed, for example, a CCD (Charge Coupled Device). The position of each pixel of the image sensor 58 is identified by the optical axis 50. For example, the optical axis 50 may be used as the origin, and an X-Y coordinate is assumed, whereby the pixel is defined as a point on the X-Y coordinate.

The rotationally emitting unit 28 is contained in a floodlight casing 59 in which a part of the circumferential wall is made as a floodlight window. As shown in FIG. 16, the lens tube 46 has a flange portion 60 to which two mirror holding plates 61 are oppositely provided. The mirror holding plates 61 include a rotating shaft 62 that is laid therebetween. The elevation adjusting rotating mirror 55 is fixed to the rotating shaft 62. The rotating shaft 62 has an end, into which an elevation gear 63 is fitted, and includes an elevation sensor 64 that is provided at the side of the other end thereof. The elevation sensor 64 measures rotation angle of the elevation adjusting rotating mirror 55 and outputs the measured result to the controlling unit 26.

One of the mirror holding plates 61 is mounted with an elevation adjusting driving motor 65. The elevation adjusting driving motor 65 has an output shaft into which a driving gear 66 is fitted. The driving gear 66 is engaged with the elevation gear 63 that is mounted to the rotating shaft 62. The elevation adjusting driving motor 65 is controlled by the controlling unit 26 and is thereby appropriately driven based on the results that are measured by the elevation sensor 64.

The floodlight casing 59 includes a bead rear sight 67 that is provided thereon. The bead rear sight 67 is used for approximate collimation with respect to the object. The collimation direction using the bead rear sight 67 is the extending direction of the floodlight axis 56 and is a direction that orthogonally crosses the extending direction of the rotating shaft 62. As shown in FIG. 16, the floodlight casing 59 includes a GPS antenna 81 that is arranged thereon. The three-dimensional laser scanner 1 is configured to obtain GPS information by the GPS antenna and to use it in the calculation performed inside.

Figure 17:
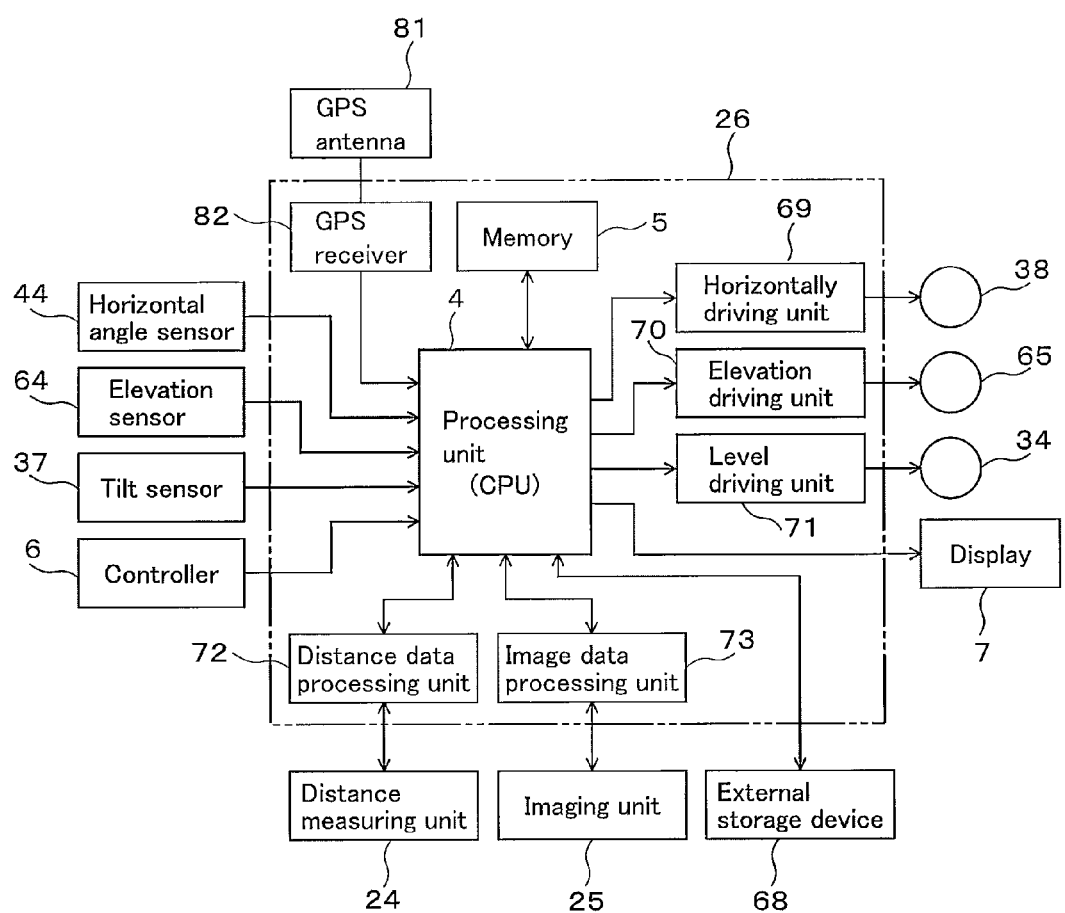
FIG. 17 is a block diagram relating to the laser scanner.

FIG. 17 is a block diagram of the controlling unit 26. The controlling unit 26 receives detection signals from the horizontal angle sensor 44, the elevation sensor 64, the tilt sensor 37, and the GPS antenna 81. The controlling unit 26 also receives instruction signals from a controller 6. The controlling unit 26 drives and controls the horizontal rotation driving motor 38, the elevation adjusting driving motor 65, and the level motor 34, and also controls a display 7 that displays working condition and measurement results, etc. The controlling unit 26 is provided with a removable external storage device 68 such as a memory card, a HDD, or the like.

The controlling unit 26 is formed of a processing unit 4, a memory 5, a horizontally driving unit 69, an elevation driving unit 70, a level driving unit 71, a distance data processing unit 72, an image data processing unit 73, etc. The memory 5 stores various programs, an integrating and controlling program for these programs, and various data such as measured data, image data, and the like. The programs include sequential programs necessary for measuring distances, elevation angles, and horizontal angles, calculation programs, programs for executing processing of measured data, and image processing programs. The programs also include programs for extracting planes from three-dimensional point cloud position data and calculating contours, image display programs for displaying the calculated contours on the display 7, and programs for controlling re-obtaining processing of the three-dimensional point cloud position data. The horizontally driving unit 69 drives and controls the horizontal rotation driving motor 38. The elevation driving unit 70 drives and controls the elevation adjusting driving motor 65. The level driving unit 71 drives and controls the level motor 34. The distance data processing unit 72 processes distance data that are obtained by the distance measuring unit 24. The image data processing unit 73 processes image data that are obtained by the imaging unit 25.

The controlling unit 26 also has a GPS receiver 82. The GPS receiver 82 processes signals that are received from a GPS satellite by the GPS antenna, and it calculates the coordinate data on the Earth. This is equal to a general GPS receiver. The positional information obtained from the GPS receiver 82 is input to a three-dimensional point cloud position data processing unit 100', which will be described later.

Figure 18:
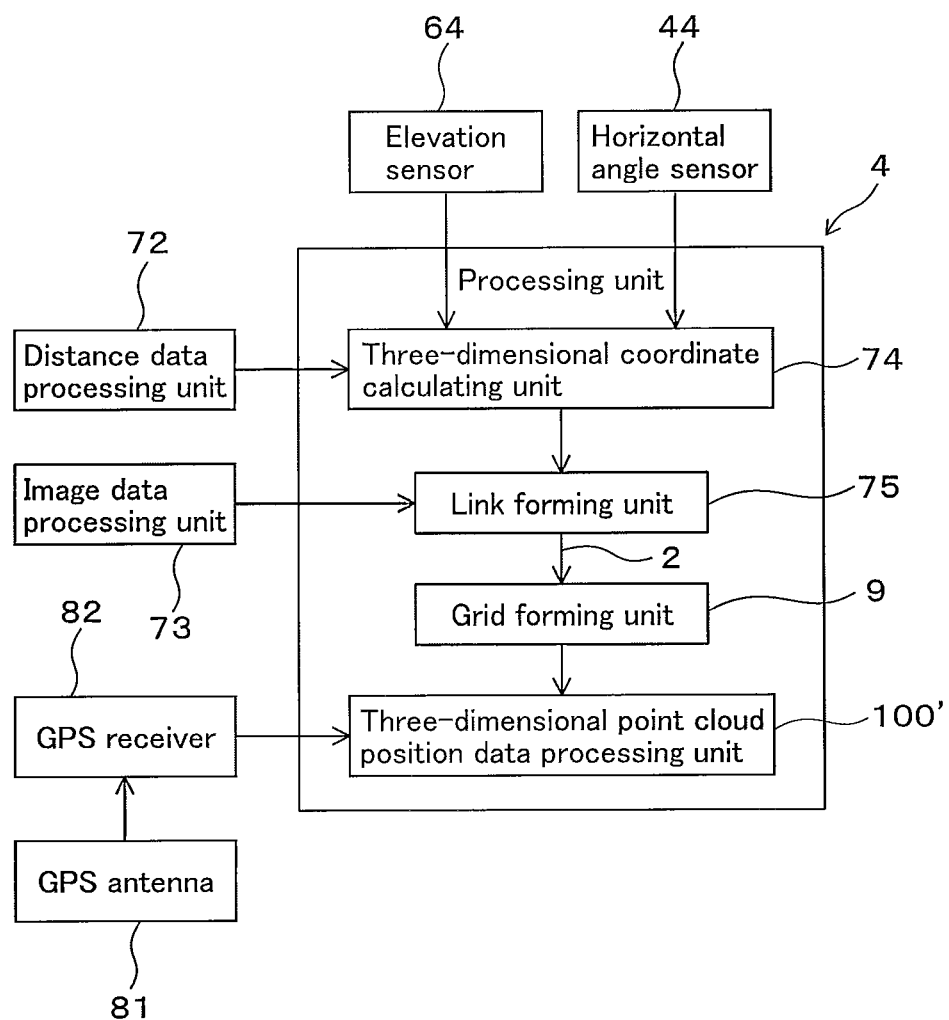
FIG. 18 is a block diagram relating to the laser scanner.

FIG. 18 is a block diagram of the processing unit 4 that has a three-dimensional coordinate calculating unit 74, a link forming unit 75, a grid forming unit 9, and a three-dimensional point cloud position data processing unit 100'. The three-dimensional coordinate calculating unit 74 receives the distance data of the target point from the distance data processing unit 72 and also receives direction data (horizontal angle and elevation angle) of the target point from the horizontal angle sensor 44 and the elevation sensor 64. The three-dimensional coordinate calculating unit 74 calculates three-dimensional coordinates (orthogonal coordinates) of each of the target points having the origin (0, 0, 0) at the position of the three-dimensional laser scanner 1, based on the received distance data and the received direction data.

The link forming unit 75 receives the image data from the image data processing unit 73 and data of three-dimensional coordinates of each of the target points, which are calculated by the three-dimensional coordinate calculating unit 74. The link forming unit 75 forms three-dimensional point cloud position data 2 in which the image data (RGB intensity of each of the target points) are linked with the three-dimensional coordinates. That is, the link forming unit 75 forms data by linking a position of a target point of the object in a two-dimensional image with three-dimensional coordinates of the target point. The linked data are calculated with respect to all of the target points and thereby form the three-dimensional point cloud position data 2.

The link forming unit 75 outputs the three-dimensional point cloud position data 2 to the grid forming unit 9. The grid forming unit 9 forms a grid (mesh) with equal distances and registers the nearest points on the intersection points of the grid when distances between adjacent points of the three-dimensional point cloud position data 2 are not constant. Alternatively, the grid forming unit 9 corrects all points to the intersection points of the grid by a linear interpolation method or a bicubic method. When the distances between the points of the three-dimensional point cloud position data 2 are constant, the processing in the grid forming unit 9 may be skipped.

Figure 19:
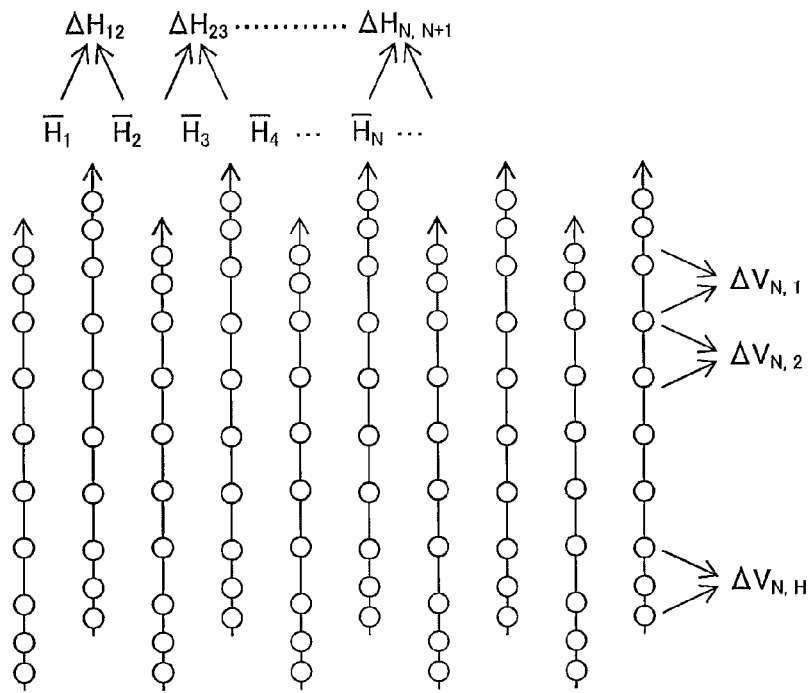
FIG. 19 is a conceptual diagram showing an example of three-dimensional point cloud position data.
Figure 20:
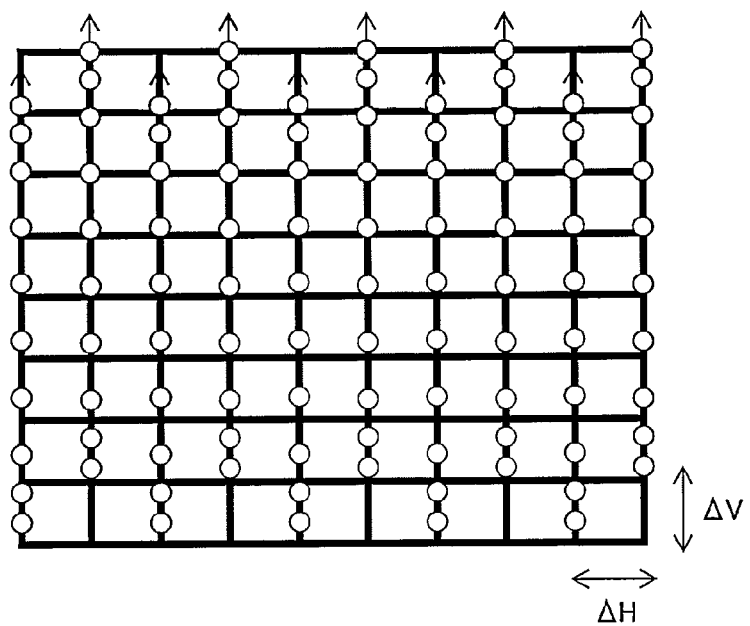
FIG. 20 is a conceptual diagram showing an example of three-dimensional point cloud position data.

The grid-forming steps will be described hereinafter. FIG. 19 is a conceptual diagram showing three-dimensional point cloud position data in which distances between points are not constant, and FIG. 20 is a conceptual diagram showing a formed grid. As shown in FIG. 19, an average horizontal distance $H_{1-N}$ of each line is obtained, and a difference $\Delta H_{i,j}$ of the average horizontal distances between the lines is calculated. Then, an average of the difference $\Delta H_{i,j}$ is obtained as a horizontal distance $\Delta H$ of the grid (Ninth Formula). In regard to distances in the vertical direction, a distance $\Delta V_{N,H}$ between adjacent points in each line in the vertical direction is calculated. Then, an average of $\Delta V_{N,H}$ in the entire image of an image size W, H is obtained as a vertical distance $\Delta V$ (Tenth Formula). As shown in FIG. 20, a grid with the calculated horizontal distance $\Delta H$ and the calculated vertical distance $\Delta V$ is formed.

$$(\Sigma \Delta H_{i,j})/(N-1)=\Delta H \quad \text{Ninth Formula}$$

$$(\Sigma \Delta V_{i,j})/(W \times H)=\Delta V \quad \text{Tenth Formula}$$

Next, the nearest points are registered on the intersection points of the formed grid. In this case, predetermined threshold values are set for distances from each point to the intersection points so as to limit the register of the points. For example, the threshold values may be set to be half of the horizontal distance $\Delta H$ and be half of the vertical distance $\Delta V$. Alternatively, all points may be corrected by adding weighting according to the distances to the intersection points therefrom as in the case of the linear interpolation method and the bicubic method. In this case, if interpolation is performed, the points are essentially not measured points.

The three-dimensional point cloud position data thus obtained are output to the three-dimensional point cloud position data processing unit 100'. The three-dimensional point cloud position data processing unit 100' is a dedicated integrated circuit formed of a FPGA, etc. and performs the same processing as in the device 100, which is described in the First Embodiment. The images provided by the three-dimensional point cloud position data processing unit 100' are displayed to a user on the display 7 in the form of the liquid crystal display.

The three-dimensional point cloud position data processing unit 100' receives the coordinate data on the Earth, which are obtained from the GPS receiver 82. According to this structure, coordinates used by the three-dimensional point cloud position data processing unit 100' are linked with the position data (for example, electronic map information) obtained from the GPS receiver 82. Thus, for example, the location of the three-dimensional laser scanner 1 can be displayed on the electronic map.

Other Matters

The controlling unit 26 may be configured to output the three-dimensional point cloud position data from the grid forming unit 9 to the outside. In this case, the three-dimensional laser scanner 1 shown in FIGS. 15 and 16 can be used in combination with the device 100 using a personal computer, which is described in the First Embodiment. In some cases, the processing performed by the three-dimensional point cloud position data processing unit 100' can be dispersed. For example, a part of the function of the three-dimensional point cloud position data processing unit 100' can also be performed in a server connected by a communication line. This is also applied to the device 100 in FIG. 1. These structures can be understood as examples of an optical information processing system of the present invention.

In order to obtain an image, although a method of photographing using a CCD camera or the like is generally used, an image of an object can also be reproduced based on the point cloud data. That is, an image of the object can be obtained by using the laser scanner instead of a photographing means such as CCD or CMOS image sensor or the like. In this case, image data is obtained based on data that is obtained by the laser scanner. In one example, the laser scanner obtains data relating to optical intensity of light reflected from each point. Thus, by using the data as pixel data for forming an image of the object, an image of the object can be reproduced.

INDUSTRIAL APPLICABILITY

The present invention can be used in techniques for measuring three-dimensional information.

What is claimed is:

1. A three-dimensional point cloud position data processing device comprising:
   a three-dimensional point cloud position data obtaining unit for obtaining first and second three-dimensional point cloud position data of an object, and the first and the second three-dimensional point cloud position data including points of planes and obtained at a first viewpoint and at a second viewpoint, respectively;
   a plane extracting unit for adding identical labels to the points in the same planes and extracting plural first planes and plural second planes, based on each of the first and the second three-dimensional point cloud position data, the first planes forming the object viewed from the first viewpoint, and the second planes forming the object viewed from the second viewpoint;
   a relative position calculating unit for calculating a relative position between a target plane and each of the other planes at each location with respect to each of the first planes and the second planes; and
   a matching plane identifying unit for comparing the relative positions of the first planes and the relative positions of the second planes and identifying a pair of the first plane and the second plane, which are most similar in the relative positions, as matching planes between the first planes and the second planes.

2. The three-dimensional point cloud position data processing device according to claim 1, wherein the relative position calculating unit calculates a correlation data group, which represents a positional relationship in a three-dimensional space between the target plane and each of the other planes, with respect to each of the first planes and the second planes, and the matching plane identifying unit evaluates similarity between the correlation data groups of the first planes and the correlation data groups of the second planes.

3. The three-dimensional point cloud position data processing device according to claim 2, wherein the correlation data group of the first plane is a data group that represents a distribution of distance between a projecting plane and each of the target plane and the other planes of the first planes, this projecting plane has a particular relationship with the target plane in the first planes, the correlation data group of the second plane is a data group that represents a distribution of distance between a projecting plane and each of the target plane and the other planes of the second planes, and this projecting plane has a particular relationship with the target plane in the second planes.

4. The three-dimensional point cloud position data processing device according to claim 3, wherein the matching plane identifying unit puts a particular plane of the first planes on a particular plane of the second planes so that centers of gravity thereof coincide with each other, and the matching plane identifying unit then calculates a difference of value at each location in the correlation data group between the particular planes and identifies a pair of planes having the smallest difference as the matching planes.

5. The three-dimensional point cloud position data processing device according to claim 1, further comprising:
a similarity evaluating unit for evaluating similarity between the first planes and the second planes based on properties thereof and determining pairs of the first planes and the second planes to be similar,
wherein the relative position calculating unit processes the pairs of the first planes and the second planes.

6. The three-dimensional point cloud position data processing device according to claim 5, wherein the similarity between the first planes and the second planes is evaluated based on at least one of the area and the shape thereof.

7. The three-dimensional point cloud position data processing device according to claim 1, further comprising:
a first positioning unit for adjusting positions between a coordinate system for the first viewpoint and a coordinate system for the second viewpoint, based on the positions of centers of gravity and normal vectors of the matching planes which are identified by the matching plane identifying unit.

8. The three-dimensional point cloud position data processing device according to claim 7, wherein the first positioning unit adjusts the positions between the coordinate system for the first viewpoint and the coordinate system for the second viewpoint, based on the entirety or a part of contours of the matching planes.

9. The three-dimensional point cloud position data processing device according to claim 7, further comprising:
a second positioning unit for adjusting positions between the first planes and the second planes other than the matching planes, based on results of the processing in the first positioning unit.

10. The three-dimensional point cloud position data processing device according to claim 9, wherein the second positioning unit adjusts positions between the planes and the points or positions between the planes.

11. The three-dimensional point cloud position data processing device according to claim 9, further comprising:
a three-dimensional model-constructing unit for constructing a three-dimensional model of the object viewed from a particular viewpoint, based on the first and the second three-dimensional point cloud position data in which the positions are adjusted by the second positioning unit.

12. The three-dimensional point cloud position data processing device according to claim 1, wherein the relative position calculating unit calculates directional correlation between adjacent planes of the first planes and directional correlation between adjacent planes of the second planes, and the matching plane identifying unit identifies the matching planes based on similarity between the directional correlation of the adjacent planes of the first planes and the directional correlation of the adjacent planes of the second planes.

13. A three-dimensional point cloud position data processing system comprising:
a three-dimensional point cloud position data obtaining means for obtaining first and second three-dimensional point cloud position data of an object, and the first and the second three-dimensional point cloud position data including points of planes and obtained at a first viewpoint and at a second viewpoint, respectively;
a plane extracting means for adding identical labels to the points in the same planes and extracting plural first planes and plural second planes, based on each of the first and the second three-dimensional point cloud position data, the first planes forming the object viewed from the first viewpoint, and the second planes forming the object viewed from the second viewpoint;
a relative position calculating means for calculating a relative position between a target plane and each of the other planes at each location with respect to each of the first planes and the second planes; and
a matching plane identifying means for comparing the relative positions of the first planes and the relative positions of the second planes and identifying a pair of the first plane and the second plane, which are most similar in the relative positions, as matching planes between the first planes and the second planes.

14. A three-dimensional point cloud position data processing method comprising:
a three-dimensional point cloud position data obtaining step for obtaining first and second three-dimensional point cloud position data of an object, and the first and the second three-dimensional point cloud position data including points of planes and obtained at a first viewpoint and at a second viewpoint, respectively;
a plane-extracting step for adding identical labels to the points in the same planes and extracting plural first planes and plural second planes, based on each of the first and the second three-dimensional point cloud position data, the first planes forming the object viewed from the first viewpoint, and the second planes forming the object viewed from the second viewpoint;
a relative position calculating step for calculating a relative position between a target plane and each of the other planes at each location with respect to each of the first planes and the second planes; and
a matching plane identifying step for comparing the relative positions of the first planes and the relative positions of the second planes and identifying a pair of the first plane and the second plane, which are most similar in the relative positions, as matching planes between the first planes and the second planes.

15. A non-transitory computer-readable-medium storing a program, when executed, causing at least one physical computer processor to perform a method of processing three-dimensional point cloud position data, comprising:
obtaining first and second three-dimensional point cloud position data of an object, and the first and the second three-dimensional point cloud position data including points of planes and obtained at a first viewpoint and at a second viewpoint, respectively;
adding identical labels to the points in the same planes and extracting plural first planes and plural second planes, based on each of the first and the second three-dimensional point cloud position data, the first planes forming the object viewed from the first viewpoint, and the second planes forming the object viewed from the second viewpoint;
calculating a relative position between a target plane and each of the other planes at each location with respect to each of the first planes and the second planes; and
comparing the relative positions of the first planes and the relative positions of the second planes and identifying a pair of the first plane and the second plane, which are most similar in the relative positions, as matching planes between the first planes and the second planes.

* * * * *